United States Patent
Bolotin et al.

(10) Patent No.: US 10,778,417 B2
(45) Date of Patent: *Sep. 15, 2020

(54) SELF-ENCRYPTING MODULE WITH EMBEDDED WIRELESS USER AUTHENTICATION

(71) Applicant: ClevX, LLC, Kirkland, WA (US)

(72) Inventors: Lev M. Bolotin, Kirkland, WA (US); Alex Lemelev, Maple (CA); Marc Singer, Seattle, WA (US)

(73) Assignee: ClevX, LLC, Kirkland, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/103,979

(22) Filed: Aug. 16, 2018

(65) Prior Publication Data

US 2019/0007203 A1    Jan. 3, 2019

Related U.S. Application Data

(63) Continuation-in-part of application No. 14/987,749, filed on Jan. 4, 2016, which is a continuation-in-part
(Continued)

(51) Int. Cl.
*G06F 21/00* (2013.01)
*H04L 9/08* (2006.01)
(Continued)

(52) U.S. Cl.
CPC ............ *H04L 9/0819* (2013.01); *G06F 21/35* (2013.01); *G06F 21/602* (2013.01);
(Continued)

(58) Field of Classification Search
CPC . H04L 9/0819; H04L 9/3297; H04L 63/0853; H04L 9/0894; H04L 9/3226;
(Continued)

(56) References Cited

U.S. PATENT DOCUMENTS 6,085,090 A * 7/2000 Yee .................... G01S 5/0027
                                                     342/450
6,175,922 B1 * 1/2001 Wang ................ G07F 7/0866
                                                     713/182
(Continued)

FOREIGN PATENT DOCUMENTS

CN          1378667 A       11/2002
CN         108604982         9/2018
(Continued)

OTHER PUBLICATIONS

"International Application Serial No. PCT US2008 077766, International Search Report dated Mar. 31, 2009", 3 pgs.
(Continued)

*Primary Examiner* — David Garcia Cervetti
(74) *Attorney, Agent, or Firm* — Schwegman Lundberg & Woessner, P.A.

(57) ABSTRACT

Methods, systems, and computer programs are presented for a self-encrypting device (SED) incorporated into a host system. In one example, the host system includes a memory, a processor, a data channel in communication with the memory and the processor, and the SED. The SED comprises an authentication subsystem, a storage subsystem that stores encrypted data that is encrypted with an encryption key provided by the authentication subsystem, a radio frequency (RF) transceiver, and a data interface in electrical contact with the data channel. The data interface is locked from sending and receiving data until the SED is unlocked by the authentication subsystem with user-authentication information received via the RF transceiver.

20 Claims, 31 Drawing Sheets

Related U.S. Application Data of application No. 12/680,742, filed as application No. PCT/US2008/077766 on Sep. 26, 2008, now Pat. No. 9,262,611.

(60) Provisional application No. 60/975,814, filed on Sep. 27, 2007.

(51) Int. Cl.

| | | |
|---|---|---|
| *H04W 12/02* | (2009.01) | |
| *H04L 9/32* | (2006.01) | |
| *G06F 21/35* | (2013.01) | |
| *G06F 21/60* | (2013.01) | |
| *H04W 12/04* | (2009.01) | |
| *H04L 29/06* | (2006.01) | |
| *H04W 12/06* | (2009.01) | |

(52) U.S. Cl.
CPC .......... *H04L 9/0894* (2013.01); *H04L 9/3226* (2013.01); *H04L 9/3297* (2013.01); *H04W 12/02* (2013.01); *H04L 63/0853* (2013.01); *H04W 12/04* (2013.01); *H04W 12/06* (2013.01)

(58) Field of Classification Search
CPC ..... H04W 12/02; H04W 12/04; H04W 12/06; G06F 21/35; G06F 21/602
See application file for complete search history.

(56) References Cited

U.S. PATENT DOCUMENTS

| | | | | |
|---|---|---|---|---|
| 6,298,441 B1* | 10/2001 | Handelman | ........ | G06Q 20/3578 713/185 |
| 6,480,096 B1* | 11/2002 | Gutman | ............. | G08B 13/1418 340/5.31 |
| 6,529,949 B1* | 3/2003 | Getsin | ..................... | G06F 21/10 380/202 |
| 6,760,688 B2* | 7/2004 | Suzuki | .................. | G06F 11/325 702/160 |
| 6,763,252 B2* | 7/2004 | Itazawa | ................. | G06F 1/1632 455/557 |
| 6,795,421 B1 | 9/2004 | Heinonen et al. | | |
| 6,845,398 B1 | 1/2005 | Galensky et al. | | |
| 6,954,753 B1* | 10/2005 | Jeran | ................... | G06F 21/6218 |
| 6,975,202 B1 | 12/2005 | Rodriguez et al. | | |
| 6,985,719 B2* | 1/2006 | Leppinen | ................ | H04L 29/06 455/412.1 |
| 7,069,447 B1* | 6/2006 | Corder | .................... | G06F 21/79 713/168 |
| 7,089,424 B1 | 8/2006 | Subbiah | | |
| 7,120,696 B1* | 10/2006 | Au | ............................ | H04L 9/12 709/229 |
| 7,269,634 B2* | 9/2007 | Getsin | .................... | G06F 21/10 709/217 |
| 7,377,422 B2* | 5/2008 | Fujinaga | ............... | G06F 13/102 235/375 |
| 7,437,145 B2 | 10/2008 | Hamada | | |
| 7,498,985 B1 | 3/2009 | Woo et al. | | |
| 7,600,000 B2* | 10/2009 | Yao | ..................... | H04L 67/1097 709/217 |
| 7,600,130 B2 | 10/2009 | Ooi et al. | | |
| 7,606,558 B2 | 10/2009 | Despain et al. | | |
| 7,624,280 B2 | 11/2009 | Oskari | | |
| 7,697,920 B1 | 4/2010 | Mcclain | | |
| 7,734,293 B2 | 6/2010 | Zilliacus et al. | | |
| 7,801,561 B2 | 9/2010 | Parikh et al. | | |
| 7,925,895 B2 | 4/2011 | Kanazawa et al. | | |
| 7,941,579 B2 | 5/2011 | Uno | | |
| 7,979,054 B2 | 7/2011 | Baysinger et al. | | |
| 8,051,302 B1 | 11/2011 | Hatanaka et al. | | |
| 8,058,971 B2 | 11/2011 | Harkins et al. | | |
| 8,311,517 B2 | 11/2012 | Brass et al. | | |
| 8,332,650 B2* | 12/2012 | Banes | ..................... | G06F 21/34 713/182 |
| 8,639,873 B1 | 1/2014 | Jevans et al. | | |
| 8,683,550 B2 | 3/2014 | Hung | | |
| 8,832,440 B2 | 9/2014 | Johnson et al. | | |
| 8,988,187 B2 | 3/2015 | Wong et al. | | |
| 9,002,800 B1 | 4/2015 | Yueh | | |
| 9,049,010 B2 | 6/2015 | Jueneman et al. | | |
| 9,075,571 B2 | 7/2015 | Bolotin et al. | | |
| 9,208,242 B2 | 12/2015 | Kindberg | | |
| 9,262,611 B2 | 2/2016 | Johnson et al. | | |
| 9,591,693 B2 | 3/2017 | Stroud | | |
| 9,813,416 B2 | 11/2017 | Bolotin et al. | | |
| 9,893,892 B2 | 2/2018 | Priebatsch | | |
| 9,900,305 B2* | 2/2018 | Levergood | ............. | G06Q 20/10 |
| 9,960,916 B2 | 5/2018 | Corndorf | | |
| 10,146,706 B2 | 12/2018 | Bolotin et al. | | |
| 10,181,055 B2 | 1/2019 | Bolotin et al. | | |
| 2001/0034714 A1* | 10/2001 | Terao | ................... | H04L 63/0442 705/57 |
| 2001/0051996 A1* | 12/2001 | Cooper | .................. | H04L 63/101 709/217 |
| 2002/0023198 A1 | 2/2002 | Kokubun et al. | | |
| 2002/0023215 A1* | 2/2002 | Wang | ..................... | G06Q 20/00 713/171 |
| 2002/0052193 A1* | 5/2002 | Chetty | ................ | G06Q 20/4012 455/412.1 |
| 2002/0081995 A1* | 6/2002 | Leppinen | ................ | H04L 67/04 455/412.1 |
| 2002/0082917 A1 | 6/2002 | Takano | | |
| 2002/0094777 A1 | 7/2002 | Cannon et al. | | |
| 2002/0099661 A1 | 7/2002 | Kii et al. | | |
| 2002/0136407 A1* | 9/2002 | Denning | ................. | G06F 21/10 380/258 |
| 2002/0147525 A1 | 10/2002 | Cayne et al. | | |
| 2002/0156921 A1 | 10/2002 | Dutta et al. | | |
| 2002/0176385 A1 | 11/2002 | Huh et al. | | |
| 2002/0178385 A1* | 11/2002 | Dent | ................... | G07C 9/00309 726/27 |
| 2002/0179622 A1 | 12/2002 | Mase | | |
| 2002/0194470 A1* | 12/2002 | Grupe | ................. | H04L 63/0428 713/153 |
| 2002/0194476 A1 | 12/2002 | Lewis et al. | | |
| 2003/0025589 A1* | 2/2003 | Koike | ................ | G06Q 20/3576 340/5.25 |
| 2003/0046593 A1 | 3/2003 | Xie et al. | | |
| 2003/0093693 A1* | 5/2003 | Blight | ..................... | H04L 63/08 726/4 |
| 2003/0106935 A1 | 6/2003 | Burchette, Jr. | | |
| 2003/0108205 A1* | 6/2003 | Joyner | .................. | H04L 9/0825 380/277 |
| 2003/0109218 A1* | 6/2003 | Pourkeramati | ........ | H04W 28/14 455/3.05 |
| 2003/0158891 A1* | 8/2003 | Lei | ........................ | G07F 11/002 709/203 |
| 2003/0172269 A1* | 9/2003 | Newcombe | ........... | H04L 67/325 713/168 |
| 2003/0176218 A1 | 9/2003 | LeMay et al. | | |
| 2003/0188207 A1* | 10/2003 | Schelling | .................. | G06F 1/24 713/310 |
| 2003/0191955 A1 | 10/2003 | Wagner et al. | | |
| 2003/0212607 A1 | 11/2003 | Chu et al. | | |
| 2003/0226011 A1* | 12/2003 | Kuwano | ................. | H04L 69/168 713/155 |
| 2003/0226025 A1* | 12/2003 | Lin | ..................... | G06F 21/6218 713/193 |
| 2004/0009815 A1* | 1/2004 | Zotto | ..................... | A63F 13/77 463/42 |
| 2004/0023642 A1 | 2/2004 | Tezuka | | |
| 2004/0044897 A1 | 3/2004 | Lim | | |
| 2004/0078568 A1 | 4/2004 | Pham et al. | | |
| 2004/0081110 A1* | 4/2004 | Koskimies | ............... | H04L 63/10 370/315 |
| 2004/0097217 A1 | 5/2004 | Mcclain | | |
| 2004/0103288 A1* | 5/2004 | Ziv | ....................... | H04L 9/0894 713/185 |

(56) References Cited

U.S. PATENT DOCUMENTS

| | | |
|---|---|---|
| 2004/0103345 A1* | 5/2004 | Dunstan .............. G06F 1/3203 714/24 |
| 2004/0106433 A1 | 6/2004 | Ooki et al. |
| 2004/0122907 A1 | 6/2004 | Chou et al. |
| 2004/0172538 A1 | 9/2004 | Satoh et al. |
| 2004/0198430 A1* | 10/2004 | Moriyama .......... G06F 3/1415 455/556.1 |
| 2004/0235514 A1 | 11/2004 | Bloch et al. |
| 2004/0236918 A1 | 11/2004 | Okaue et al. |
| 2004/0236919 A1 | 11/2004 | Okaue et al. |
| 2004/0259545 A1* | 12/2004 | Morita ................ H04W 88/02 455/435.1 |
| 2005/0021959 A1* | 1/2005 | Tsushima ............. H04L 63/083 713/170 |
| 2005/0080903 A1* | 4/2005 | Valenci ................ H04L 41/082 709/227 |
| 2005/0097320 A1* | 5/2005 | Golan .................... G06F 21/40 713/166 |
| 2005/0114689 A1 | 5/2005 | Strom et al. |
| 2005/0210271 A1 | 9/2005 | Chou et al. |
| 2005/0210380 A1* | 9/2005 | Kramer .................. G06T 11/00 715/244 |
| 2005/0270139 A1 | 12/2005 | Park et al. |
| 2005/0288060 A1 | 12/2005 | Kojima |
| 2006/0005023 A1 | 1/2006 | Homer et al. |
| 2006/0041750 A1* | 2/2006 | Carter ................... H04L 9/0841 713/168 |
| 2006/0047961 A1* | 3/2006 | Hashimoto .......... G06Q 20/341 713/173 |
| 2006/0048236 A1 | 3/2006 | Multerer et al. |
| 2006/0052085 A1* | 3/2006 | Gregrio Rodriguez ...................... H04W 12/06 455/411 |
| 2006/0063590 A1 | 3/2006 | Abassi et al. |
| 2006/0064757 A1* | 3/2006 | Poslinski ............. H04N 21/441 726/26 |
| 2006/0069711 A1* | 3/2006 | Tsunekawa .......... G06F 11/1464 709/200 |
| 2006/0085644 A1* | 4/2006 | Isozaki ................. H04L 9/0844 713/171 |
| 2006/0085847 A1* | 4/2006 | Ikeuchi ................. G06F 21/35 726/6 |
| 2006/0105740 A1* | 5/2006 | Puranik ............. H04W 12/1204 455/410 |
| 2006/0105749 A1* | 5/2006 | Han ......................... H04N 7/00 455/412.1 |
| 2006/0123056 A1 | 6/2006 | Darbha et al. |
| 2006/0128305 A1 | 6/2006 | Delalat |
| 2006/0133606 A1* | 6/2006 | Eberwein .............. G06F 21/78 380/30 |
| 2006/0135065 A1* | 6/2006 | Lee ....................... H04W 12/003 455/41.1 |
| 2006/0141986 A1* | 6/2006 | Shinozaki ............ H04M 3/5233 455/410 |
| 2006/0161749 A1* | 7/2006 | Chen .................... G06Q 30/0277 711/164 |
| 2006/0170533 A1 | 8/2006 | Chioiu et al. |
| 2006/0200305 A1* | 9/2006 | Sheha .................... G09B 29/10 701/420 |
| 2006/0200681 A1 | 9/2006 | Kato et al. |
| 2006/0206709 A1 | 9/2006 | Labrou |
| 2006/0206720 A1 | 9/2006 | Harada et al. |
| 2006/0236105 A1 | 10/2006 | Brok et al. |
| 2006/0236363 A1 | 10/2006 | Heard et al. |
| 2006/0240806 A1 | 10/2006 | Demirbasa et al. |
| 2006/0248599 A1* | 11/2006 | Sack .................... G06F 21/6227 726/27 |
| 2006/0265605 A1 | 11/2006 | Ramezani |
| 2006/0271789 A1 | 11/2006 | Satomura et al. |
| 2007/0011724 A1* | 1/2007 | Gonzalez .............. G06F 21/79 726/4 |
| 2007/0015589 A1* | 1/2007 | Shimizu .............. G06F 21/6245 463/43 |
| 2007/0016743 A1 | 1/2007 | Jevans |
| 2007/0050622 A1 | 3/2007 | Rager et al. |
| 2007/0050643 A1 | 3/2007 | Negishi |
| 2007/0053308 A1 | 3/2007 | Dumas |
| 2007/0073937 A1 | 3/2007 | Feinberg et al. |
| 2007/0088521 A1* | 4/2007 | Shmueli ............... A61B 5/0205 702/127 |
| 2007/0092082 A1* | 4/2007 | Rush ...................... G06F 21/57 380/277 |
| 2007/0100771 A1* | 5/2007 | Eckleder ............... G06F 21/10 705/67 |
| 2007/0143013 A1* | 6/2007 | Breen ................... G01S 5/0027 701/32.3 |
| 2007/0149170 A1 | 6/2007 | Bloebaum et al. |
| 2007/0162963 A1 | 7/2007 | Penet et al. |
| 2007/0191057 A1 | 8/2007 | Kamada |
| 2007/0192488 A1* | 8/2007 | DaCosta ................ H04W 12/06 709/225 |
| 2007/0192601 A1 | 8/2007 | Spain et al. |
| 2007/0198856 A1 | 8/2007 | Lee et al. |
| 2007/0203618 A1 | 8/2007 | Mcbride et al. |
| 2007/0239994 A1 | 10/2007 | Kulkarni et al. |
| 2007/0244822 A1* | 10/2007 | Hogan ................ H04L 63/0428 705/57 |
| 2007/0255962 A1 | 11/2007 | Lu et al. |
| 2007/0264965 A1* | 11/2007 | Taniguchi ............. H04W 12/06 455/403 |
| 2007/0288386 A1* | 12/2007 | Adachi .................. G06F 21/10 705/58 |
| 2007/0294746 A1 | 12/2007 | Sasakura et al. |
| 2007/0300052 A1* | 12/2007 | Jevans .................... G06F 21/41 713/1 |
| 2008/0005577 A1 | 1/2008 | Rager et al. |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0010465 A1 | 1/2008 | Shen |
| 2008/0014869 A1 | 1/2008 | Demirbasa et al. |
| 2008/0017711 A1 | 1/2008 | Adams et al. |
| 2008/0022043 A1 | 1/2008 | Adams et al. |
| 2008/0022090 A1* | 1/2008 | Kishimoto ........... G04N 1/4426 713/156 |
| 2008/0028120 A1* | 1/2008 | McLeod .............. G06F 13/4045 710/313 |
| 2008/0034019 A1* | 2/2008 | Cisler .................. G06F 11/1456 |
| 2008/0034223 A1* | 2/2008 | Funahashi ........... G06F 21/6218 713/193 |
| 2008/0039134 A1 | 2/2008 | Hattori et al. |
| 2008/0040265 A1 | 2/2008 | Rackley, III et al. |
| 2008/0041936 A1* | 2/2008 | Vawter ............... G06Q 20/3674 235/380 |
| 2008/0041951 A1 | 2/2008 | Adams et al. |
| 2008/0045177 A1 | 2/2008 | Wise |
| 2008/0052439 A1* | 2/2008 | Young .................. G06K 19/077 710/305 |
| 2008/0055041 A1 | 3/2008 | Takene et al. |
| 2008/0070495 A1* | 3/2008 | Stricklen ............... H04W 12/06 455/3.01 |
| 2008/0070501 A1* | 3/2008 | Wyld ...................... H04L 63/08 455/41.2 |
| 2008/0086320 A1* | 4/2008 | Ballew ................... G06Q 10/00 705/342 |
| 2008/0086323 A1* | 4/2008 | Petrie ..................... G06F 16/24 705/342 |
| 2008/0086509 A1* | 4/2008 | Wallace .................. G06Q 10/10 |
| 2008/0090612 A1* | 4/2008 | Glinka ................... H04W 12/06 455/557 |
| 2008/0098225 A1* | 4/2008 | Baysinger .............. H04L 9/3226 713/171 |
| 2008/0114855 A1 | 5/2008 | Welingkar et al. |
| 2008/0115141 A1 | 5/2008 | Welingkar et al. |
| 2008/0115152 A1 | 5/2008 | Welingkar et al. |

(56) References Cited

U.S. PATENT DOCUMENTS

| | | |
|---|---|---|
| 2008/0115226 A1 | 5/2008 | Welingkar et al. |
| 2008/0120726 A1 | 5/2008 | Tsunehiro et al. |
| 2008/0120729 A1 | 5/2008 | Eren et al. |
| 2008/0126145 A1 | 5/2008 | Rackley, III et al. |
| 2008/0130575 A1* | 6/2008 | Jun ................... H04W 92/02 370/331 |
| 2008/0141041 A1* | 6/2008 | Molaro ................ H04L 9/08 713/193 |
| 2008/0141378 A1* | 6/2008 | Mclean ................ G06F 21/10 726/26 |
| 2008/0144829 A1* | 6/2008 | Mitsuoka ............ H04L 9/0894 380/270 |
| 2008/0151847 A1 | 6/2008 | Abujbara |
| 2008/0168247 A1 | 7/2008 | Goodwill et al. |
| 2008/0177860 A1 | 7/2008 | Khedouri et al. |
| 2008/0195863 A1* | 8/2008 | Kennedy ............. G06F 21/35 713/168 |
| 2008/0209553 A1* | 8/2008 | Lu .................. G06F 12/1433 726/22 |
| 2008/0212771 A1 | 9/2008 | Hauser |
| 2008/0212783 A1* | 9/2008 | Oba .................. H04L 63/0807 380/279 |
| 2008/0214215 A1 | 9/2008 | Aaltonen et al. |
| 2008/0215841 A1 | 9/2008 | Bolotin et al. |
| 2008/0216153 A1 | 9/2008 | Aaltonen et al. |
| 2008/0222734 A1* | 9/2008 | Redlich ................ H04L 63/02 726/26 |
| 2008/0252415 A1* | 10/2008 | Larson ............. G07C 9/00309 340/5.73 |
| 2008/0263363 A1* | 10/2008 | Jueneman .......... G06F 21/6218 713/184 |
| 2008/0267404 A1 | 10/2008 | Budde et al. |
| 2008/0303631 A1* | 12/2008 | Beekley ............... G06F 21/79 340/5.74 |
| 2008/0313082 A1 | 12/2008 | Van Bosch et al. |
| 2009/0034731 A1* | 2/2009 | Oshima ............... H04L 63/18 380/270 |
| 2009/0036164 A1* | 2/2009 | Rowley ............... H04L 9/3234 455/558 |
| 2009/0037748 A1 | 2/2009 | Kim et al. |
| 2009/0040028 A1 | 2/2009 | Price et al. |
| 2009/0054104 A1 | 2/2009 | Borean et al. |
| 2009/0063802 A1 | 3/2009 | Johnson et al. |
| 2009/0070857 A1* | 3/2009 | Azuma ................ G06F 21/33 726/3 |
| 2009/0083449 A1* | 3/2009 | Mashinsky .......... G06F 16/273 710/8 |
| 2009/0097719 A1 | 4/2009 | Lim |
| 2009/0119754 A1* | 5/2009 | Schubert ............. H04L 63/205 726/4 |
| 2009/0178144 A1 | 7/2009 | Redlich et al. |
| 2009/0232312 A1* | 9/2009 | Inoue ............... G11B 20/00543 380/278 |
| 2009/0300710 A1* | 12/2009 | Chai .................. G06F 21/6218 726/1 |
| 2009/0307489 A1* | 12/2009 | Endoh ................ H04L 63/0428 713/168 |
| 2010/0015942 A1 | 1/2010 | Huang et al. |
| 2010/0031336 A1 | 2/2010 | Dumont et al. |
| 2010/0135491 A1 | 6/2010 | Bhuyan |
| 2010/0138908 A1* | 6/2010 | Vennelakanti .......... G06F 21/33 726/11 |
| 2010/0250937 A1 | 9/2010 | Blomquist et al. |
| 2010/0253508 A1* | 10/2010 | Koen .................. G01S 5/0027 340/539.13 |
| 2010/0274859 A1 | 10/2010 | Bucuk |
| 2010/0287373 A1 | 11/2010 | Johnson et al. |
| 2011/0060921 A1 | 3/2011 | Michael |
| 2011/0313922 A1 | 12/2011 | Ben Ayed |
| 2013/0010962 A1* | 1/2013 | Buer .................. G06F 21/35 380/270 |
| 2013/0073406 A1* | 3/2013 | Gazdzinski ............ G04G 21/04 705/21 |
| 2013/0283049 A1 | 10/2013 | Brown et al. |
| 2015/0058624 A1 | 2/2015 | Borisov et al. |
| 2015/0278125 A1 | 10/2015 | Bolotin et al. |
| 2016/0119339 A1 | 4/2016 | Bolotin et al. |
| 2016/0259736 A1 | 9/2016 | Bolotin et al. |
| 2017/0017810 A1 | 1/2017 | Bolotin et al. |
| 2017/0070345 A9* | 3/2017 | Lee ..................... G06F 21/10 |
| 2017/0075636 A1 | 3/2017 | Chang et al. |
| 2017/0214528 A1 | 7/2017 | Priebatsch |
| 2018/0307869 A1 | 10/2018 | Bolotin et al. |
| 2018/0357406 A1 | 12/2018 | Bolotin et al. |

FOREIGN PATENT DOCUMENTS

| | | |
|---|---|---|
| GB | 2562923 B | 2/2020 |
| JP | 2004326763 A | 11/2004 |
| JP | 2006139757 A | 6/2006 |
| JP | 2006251857 A | 9/2006 |
| JP | 2009524880 A | 7/2009 |
| JP | 2020057412 A | 4/2020 |
| KR | 1020010106325 | 11/2001 |
| KR | 1020050023050 | 3/2005 |
| TW | 583568 B | 4/2004 |
| TW | I252701 B | 4/2006 |
| TW | 200715801 A | 4/2007 |
| TW | 537732 | 6/2016 |
| TW | 201737151 | 10/2017 |
| WO | WO-2006041569 A2 | 4/2006 |
| WO | 2009042820 | 4/2009 |
| WO | 2017123433 | 7/2017 |
| WO | WO-2020037053 A1 | 2/2020 |

OTHER PUBLICATIONS

"International Application Serial No. PCT US2008 077766, Written Opinion dated Mar. 31, 2009", 7 pgs.

"International Application Serial No. PCT US2008 077766, International Preliminary Report on Patentability dated Mar. 30, 2010", 8 pgs.

"U.S. Appl. No. 12/680,742, Preliminary Amendment filed Jun. 5, 2012", 2 pgs.

"U.S. Appl. No. 12/680,742, Non Final Office Action dated Mar. 12, 2013", 12 pgs.

"U.S. Appl. No. 12/680,742, Response filed Jun. 12, 2013 to Non Final Office Action dated Mar. 12, 2013", 16 pgs.

"U.S. Appl. No. 12/680,742, Final Office Action dated Sep. 27, 2013", 13 pgs.

"U.S. Appl. No. 12/680,742, Response filed Nov. 27, 2013 to Final Office Action dated Sep. 27, 2013", 15 pgs.

"U.S. Appl. No. 12/680,742, Advisory Action dated Dec. 19, 2013", 3 pgs.

"U.S. Appl. No. 12/680,742, Non Final Office Action dated Apr. 7, 2014", 14 pgs.

"U.S. Appl. No. 12/680,742, Response filed Jul. 7, 2014 to Non Final Office Action dated Apr. 7, 2014", 20 pgs.

"U.S. Appl. No. 12/680,742, Final Office Action dated Oct. 28, 2014", 16 pgs.

"U.S. Appl. No. 12/680,742, Response filed Dec. 29, 2014 to Final Office Action dated Oct. 28, 2014", 16 pgs.

"U.S. Appl. No. 12/680,742, Advisory Action dated Jan. 27, 2015", 3 pgs.

"U.S. Appl. No. 12/680,742, Non Final Office Action dated Mar. 27, 2015", 15 pgs.

"U.S. Appl. No. 12/680,742, Response filed Jun. 29, 2015 to Non Final Office Action dated Mar. 27, 2015", 14 pgs.

"U.S. Appl. No. 12/680,742, Notice of Allowance dated Oct. 1, 2015", 8 pgs.

"U.S. Appl. No. 14/987,678, Non Final Office Action dated Feb. 10, 2017", 11 pgs.

"International Application Serial No. PCT US2017 012060, International Search Report dated Mar. 27, 2017", 2 pgs.

"International Application Serial No. PCT US2017 012060, Written Opinion dated Mar. 27, 2017", 6 pgs.

(56) References Cited

OTHER PUBLICATIONS

"Application Serial No. 14/987,678, Response filed Jun. 21, 2017 to Non Final Office Action dated Feb. 10, 2017", 9 pgs.
"U.S. Appl. No. 14/987,749, Non Final Office Action dated Aug. 10, 2017", 12 pgs.
"U.S. Appl. No. 14/987,678, Notice of Allowance dated Aug. 10, 2017", 9 pgs.
"U.S. Appl. No. 14/987,678, 312 Amendment filed Sep. 5, 2017", 3 pgs.
"U.S. Appl. No. 14/987,678, PTO Response to Rule 312 Communication dated Sep. 11, 2017", 2 pgs.
"U.S. Appl. No. 14/987,749, Response filed Nov. 10, 2017 to Non Final Office Action dated Aug. 10, 2017", 14 pgs.
"U.S. Appl. No. 14/987,749, Final Office Action dated Feb. 22, 2018", 15 pgs.
"U.S. Appl. No. 14/987,749, Response filed May 4, 2018 to Final Office Action dated Feb. 22, 2018", 21 pgs.
"U.S. Appl. No. 14/987,749, Non Final Office Action dated Jun. 7, 2018", 11 pgs.
"International Application Serial No. PCT US2017 012060, International Preliminary Report on Patentability dated Jul. 19, 2018", 8 pgs.
"U.S. Appl. No. 14/987,749, Examiner Interview Summary dated Sep. 10, 2018", 2 pgs.
"U.S. Appl. No. 14/987,749, Response filed Sep. 11, 2018 to Non Final Office Action dated Jun. 7, 2018", 12 pgs.
"U.S. Appl. No. 14/987,749, Notice of Allowance dated Sep. 27, 2018", 14 pgs.
"Chinese Application Serial No. 201780005638.6, Voluntary Amendment filed Apr. 1, 2019", w English Claims, 19 pgs.
"U.S. Appl. No. 16/021,547, Non Final Office Action dated Aug. 7, 2019", 16 pgs.
"U.S. Appl. No. 16/021,547, Response filed Nov. 7, 2019 to Non Final Office Action dated Aug. 7, 2019", 16 pgs.
"U.S. Appl. No. 16/103,983, Non Final Office Action dated Sep. 5, 2019", 16 pgs.
"U.S. Appl. No. 16/103,983, Response filed Dec. 3, 2019 to Non Final Office Action dated", 19 pgs.
"Chinese Application Serial No. 201780005638.6, Office Action dated Jul. 2, 2019", w/ English Translation, 15 pgs.
"Chinese Application Serial No. 201780005638.6, Response filed Nov. 6, 2019 to Office Action dated Jul. 2, 2019", w/ English Claims, 18 pgs.
"International Application Serial No. PCT/US2019/046522, International Search Report dated Oct. 17, 2019", 5 pgs.
"International Application Serial No. PCT/US2019/046522, Written Opinion dated Oct. 17, 2019", 7 pgs.
"Japanese Application Serial No. 2018-553854, Notification of Reasons for Refusal dated Aug. 6, 2019", w/ English Translation, 6 pgs.
"Japanese Application Serial No. 2018-553854, Response filed Oct. 28, 2019 to Notification of Reasons for Refusal dated Aug. 6, 2019", w/ English Claims, 12 pgs.
"Taiwanese Application Serial No. 106100149, First Office Action dated Sep. 20, 2019", w/ English Translation, 7 pgs.
"Taiwanese Application Serial No. 106100149, Voluntary Amendment filed Aug. 6, 2019", w/ English Claims, 26 pgs.
"United Kingdom Application Serial No. 1811137.7, Examination Report under Section 18(3) dated Aug. 12, 2019", 2 pgs.
"United Kingdom Application Serial No. 1811137.7, Response filed Oct. 14, 2019 to Examination Report under Section 18(3) dated Aug. 12, 2019", 36 pgs.
"Chinese Application Serial No. 201780005638.6, Office Action dated Feb. 3, 2020", w/ English Translation, 8 pgs.

\* cited by examiner

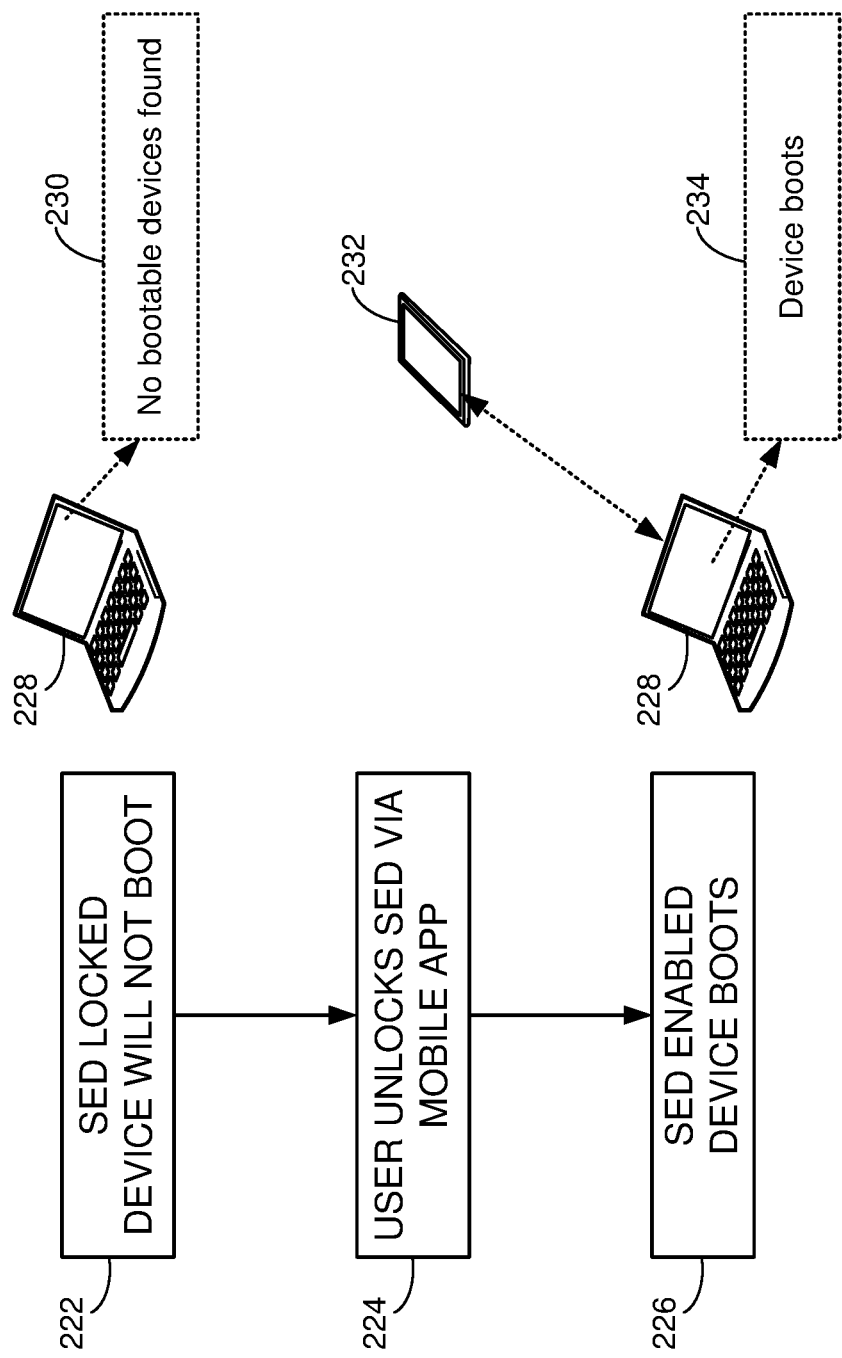

REMOTE MANAGEMENT

Account Summary: CorpA    Admin: admin.corpa@srm.com    Users    Drives    Log Out    ?

Users Dashboard  [search] 🔍

LOGIN  ↙1708  ENABLE   MORE          Save

| NAME | LOGIN | | |
|------|-------|---|---|
| Alex | alex@corpa.com | ✓ | ☐ |
| Kate | kate@corpb.com | ✓ | ☐ |
| Lev | lev@corpa.com | | ☐ |
| Steve | st45@corpc.com | ✓ | ☐ |

Create User

Name  [_____]  Import

Email Address  [_____]  [Create] ←1710

REMOTE MANAGEMENT

Account Summary: CorpA    Admin: admin.corpa@srm.com    Users    Drives

Log Out

Account: Client1

| Summary | Admin Contacts | User Contacts | Drives Activity |

| | |
|---|---|
| Licensed to | CorpA |
| License Type | Master |
| License Created By | Master |
| License Key | F835747896-0E1F-511-AAF5-121313312b0486E |
| Number of Admins | 21 used of 100 |
| Number of Users | 3 used of 1000 |
| Number of Drives | 4 used of 1000 |

FIG. 19

REMOTE MANAGEMENT

2004 — Account Summary: CorpA    Admin: admin.corpa@srm.com    Users    Drives    Log Out ⓘ

Account: Client1

Summary    Admin Contacts   2008 — User Contacts    Drives Activity
2006

| ADMINS | MOBILE PHONE | LAST LOGIN |
|---|---|---|
| admin@corpa.com | +14161234567 | 7/5/2018 6:39PM |
| test | | |
| smith@corpa.com | +14084823585 | 10/17/2017 1:00PM |
| katia | +14084823586 | 1/5/18 11:11AM |
| Joe | +14044820455 | 2/1/17 4:55PM |
| admin@corpa.com | +6506506506 | 12/22/17 8:00AM |

REMOTE MANAGEMENT

Account Summary: CorpA   Admin: admin.corpa@srm.com   Users   Drives   Log Out   ?

Account: Client1

| Summary | Admin Contacts | User Contacts | Drives Activity |

| DRIVE S/N | PROVISIONED ON | PROVISIONED BY | LAST ATTEMPT | USED BY | |
|---|---|---|---|---|---|
| 5019201574657 | 1/6/2016 6:22PM | admin@corpa.com | 7/5/2018 6:39PM | alex@corpa.com | ● |
| 261145785 | 1/9/2017 8:00AM | admin@corpa.com | 7/5/2018 8:39AM | lev@corpa.com | ● |
| 5018796325479 | 11/1/2017 5:00PM | admin@corpa.com | 7/3/2018 1:00PM | jose@corpa.com | ● |
| 1456785412878 | 7/5/18 11:15AM | admin@corpa.com | 6/30/2018 1:11AM | katia@corpa.com | ● |

FIG. 21

SELF-ENCRYPTING MODULE WITH EMBEDDED WIRELESS USER AUTHENTICATION

CLAIM OF PRIORITY

This application is a continuation-in-part application of U.S. patent application Ser. No. 14/987,749, entitled "Data Security System with Encryption," filed on Jan. 4, 2016, which is a continuation-in-part of U.S. patent application Ser. No. 12/680,742 filed Mar. 29, 2010, which is the National Stage of International Application number PCT/US2008/077766, filed Sep. 26, 2008, which claims the benefit of U.S. Provisional Patent Application Ser. No. 60/975,814 filed Sep. 27, 2007, all of which are incorporated herein by reference in their entirety.

The present application contains subject matter related to U.S. patent application Ser. No. 14/987,678, filed on Jan. 4, 2016, entitled "Data Security System with Encryption," which is incorporated herein by reference.

TECHNICAL FIELD

The present invention relates generally to electronic devices, and more particularly to memory devices.

BACKGROUND

Security is a critical issue with almost all aspects of computer use. Storage media, such as hard disk drives attached to computers, contain valuable information, which is vulnerable to data theft. A great deal of money and effort are being applied to guarding personal, corporate, and government security information.

As portable memory storage devices have become smaller, easier to lose, more ubiquitous, cheaper, and larger in memory capacity, they have come to pose extraordinary security problems. It is now possible to download massive amounts of information surreptitiously into portable memory storage devices, such as universal serial bus flash and micro drives, cellphones, camcorders, digital cameras, iPODs, MP3/4 players, smart phones, palm and laptop computers, gaming equipment, authenticators, tokens (containing memory), etc.—in general, a mass storage device (MSD).

More specifically, there are millions of MSDs being used for backup, transfer, intermediate storage, and primary storage into which information can be easily downloaded from a computer and carried away. The primary purpose of any MSD is to store and retrieve "portable content," which is data and information tied to a particular owner, not a particular computer.

The most common means of providing storage security is to authenticate the user with a computer-entered password. A password is validated against a MSD stored value. If a match occurs, the drive will open. Or, the password itself is used as the encryption key to encrypt/decrypt data stored to the MSD.

For drives that support on-the-fly encryption, the encryption key is often stored on the media in an encrypted form. Since the encryption key is stored on the media, it becomes readily available to those willing to circumvent the standard interface and read the media directly. Thus, a password is used as the key to encrypt the encryption key.

For self-authenticating drives with on-the-fly encryption—e.g., self-encrypting drives (SEDs), their authentication sub-system is responsible for maintaining security. There is no dependency on a host computer to which it is connected. Thus, a password cannot (or need not) be sent from the host in order to unlock the MSD. In fact, the encryption key no longer needs to be stored on the media. The authentication subsystem becomes the means for managing encryption keys.

Some SEDs may also be installed within other devices, such as hard drives with encryption capabilities installed within servers, personal computers, printers, scanners, laptops, tablets, embedded systems, mobile devices, etc. However, some solutions rely on a user entering a password on the hosting device, and then the password is transmitted to the SED. Because they rely on the host, these SEDs have dependencies on the architecture of the host, such as hardware interfaces and host operating systems. Further, by having to maintain a communication channel to receive the passwords, the STDs are susceptible to hacking via this communication channel; the SEDs cannot be completely locked out from the host as the SEDs have to have some open data channels to send the user-authentication information.

Thus, a need still remains for improved security. In view of the ever-increasing commercial competitive pressures, along with growing consumer expectations and diminishing opportunities for meaningful product differentiation in the marketplace, it is critical that answers be found for these problems. Additionally, the needs to reduce costs, improve efficiencies and performance, and meet competitive pressures add an even greater urgency to the critical necessity for finding answers to these problems.

Solutions to these problems have been long sought, but prior developments have not taught or suggested any solutions and, thus, solutions to these problems have long eluded those skilled in the art.

DISCLOSURE OF THE INVENTION

The present invention provides a method of operation of a data security system including: providing a mobile device with a data security system application for connectivity with the data security system; starting the data security system application; and maintaining connectivity of the data security system with the mobile device.

The present invention provides a data security system including: a data security transceiver or receiver; an authentication subsystem operatively connected to the data security transceiver or receiver; and a storage subsystem connected to the authentication subsystem. The self-encrypting device provides host-independent (e.g., autonomous) user-authentication because the self-encrypting device does not use the resources from the host to authenticate the user, instead, the self-encrypt and device utilizes its own resources to authenticate a user. Further, the user authentication by the self-encrypting device is independent, not only from the host, but also from the operating system (OS) executing in the host because the OS resources are not used for the user authentication. The resources used by the self-encrypting device for authenticating the user include a radiofrequency transceiver to receive the user-authentication information.

Certain embodiments of the invention have other aspects in addition to or in place of those mentioned above. The aspects will become apparent to those skilled in the art from a reading of the following detailed description when taken with reference to the accompanying drawings.

BRIEF DESCRIPTION OF THE DRAWINGS

FIG. 2C illustrates a method for unlocking the SED inside a laptop.

FIG. 17 is a user interface for managing users of remote devices, according to some example embodiments.

FIG. 19 is a user interface that provides a summary of the configured features for a client, according to some example embodiments.

FIG. 20 is a user interface for configuring administrator contacts for a client, according to some example embodiments.

FIG. 21 is a user interface for accessing drive-activity information, according to some example embodiments.

DETAILED DESCRIPTION

Figure 1:
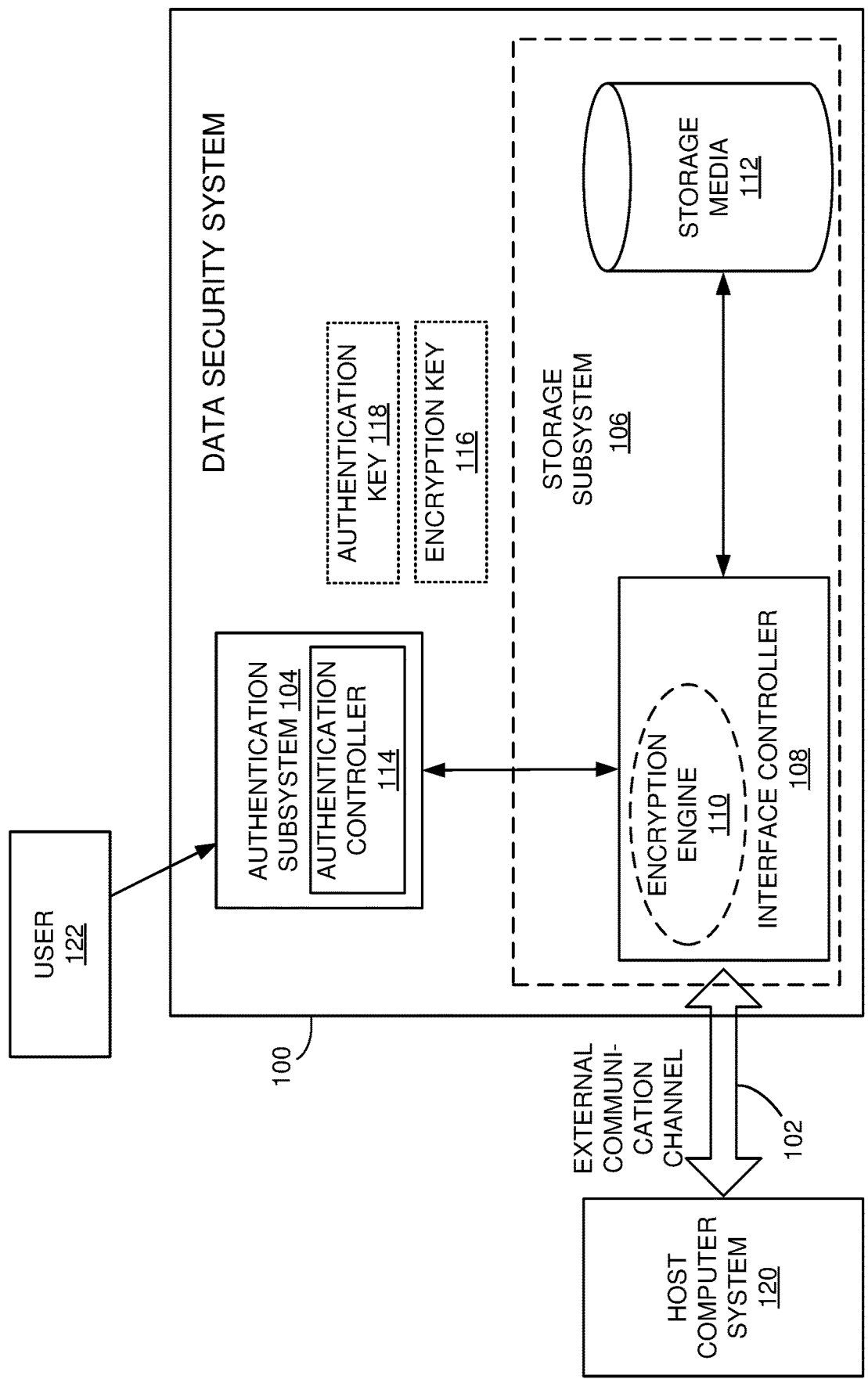
FIG. 1 is a schematic of a data security system in accordance with an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In some implementations, a self-encrypting drive (SED), with embedded wireless user authentication, is presented. Implementations are described for the use of SEDs as hard drives, e.g., hard disk drives (HDD), solid-state drives (SSD), or other types of Flash-based data storage memory devices and boards), but the SEDs may also be used for other types of applications, such as printers, scanners, tablets, embedded systems, mobile devices, etc. The SED may be referred to herein also as a Data Security System (DSS) or simply as drive. The wireless authentication is performed independently of the host device that is accessing the storage of the SED. For example, a mobile device may establish a direct, wireless connection to the SED to provide user-authentication information and unlock the SED for access from another device, such as a host. The host may be unaware of the wireless authentication and view the SED as a regular hard drive or other type of storage device.

The user-authentication information is kept in an authentication subsystem that is separate from the communication channel. Therefore, the user-authentication information is never accessible from the outside, via the communication channel or any other communication channel.

Additionally, the data in the storage media of the SED is encrypted for internal storage, but the data is transmitted in clear form when sending to or receiving from the host.

In other implementations, a remote management system is provided for providing administrative control of users and SEDs. From the remote management system console, an administrator is able to control the SEDs, such as enabling or disabling an SED, configuring access by users, setting time or geographic limits on the use of the SED, permanently disabling the SED, etc. Additionally, the remote management system may create user accounts, define administrators and users, provide user interfaces for users and drives, manage user licenses, and set up and enforce security options.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown exaggerated in the drawing figures. Where multiple embodiments are disclosed and described having some features in common, for clarity and ease of illustration, description, and comprehension thereof, similar and like features one to another will ordinarily be described with similar or the same reference numerals. Similarly, although the views in the drawings for ease of description generally show similar orientations, this depiction in the figures is arbitrary for the most part. Generally, the invention can be operated in any orientation.

The term "system" as used herein refers to and is defined as the method and as the apparatus of the present invention in accordance with the context in which the term is used. The term "method" as used herein refers to and is defined as the operational steps of an apparatus.

For reasons of convenience and not limitation, the term "data" is defined as information that is capable of being produced by or stored in a computer. The term "data security system" is defined as meaning any portable memory device incorporating a storage medium. The term "storage media" as used herein refers to and is defined as any solid state, NAND flash, and/or magnetic data recording system. The term "locked" refers to the data security system when the storage media is not accessible, and the term "unlocked" refers to the data security system when the storage media is accessible.

There are generally two methods to make a storage device tamper-resistant: 1. Apply epoxy to components—an epoxy resin applied to the printed circuit board can make it difficult to disassemble the storage device without destroying storage media. 2. Encrypt memory data—data gets encrypted as it is written to the storage media and an encryption key is required to decipher the data.

Referring now to FIG. 1, therein is shown a schematic of a data security system 100 in accordance with an embodiment of the present invention. The data security system 100 consists of an external communication channel 102, an authentication subsystem 104, and a storage subsystem 106.

The storage subsystem 106 is electronic circuitry that includes an interface controller 108, an encryption engine 110, and storage media 112. The storage media 112 can be an internal or external hard disk drive, USB flash drive, solid state drive, hybrid drive, memory card, tape cartridge, and optical media including optical disk (e.g., Blu-ray disk, digital versatile disk or DVD, and compact disk or CD). The storage media 112 can include a data protection appliance, archival storage system, and cloud-based data storage system. The cloud storage system may be accessed utilizing a plug-in (or "plugin") application or extension software installed in a browser application, either on the host computer or on another system coupled to the host computer via a wired or wireless network, such as RF or optical, or over the world wide web.

The interface controller 108 includes electronic components such as a micro-controller with the encryption engine 110 of software or hardware, although the encryption engine 110 can be in a separate controller in the storage sub system 106.

The authentication subsystem 104 is electronic circuitry that includes an authentication controller 114, such as a micro-controller, which may have its own non-volatile memory, such as an electrically erasable programmable read-only memory (EEPROM).

The external communication channel 102 provides a means of exchanging data with a host computer system 120. Universal Serial Bus (USB) is one of the most popular means to connect the data security system 100 to the host computer system 120. Other examples of the external communication channel 102 include Firewire, wireless USB, Serial ATA (SATA), Peripheral Component Interconnect (PCI), Integrated Drive Electronics (IDE), Small Computer System Interface (SCSI), Industry Standard Architecture (ISA), Personal Computer Memory Card International Association (PCMCIA), Peripheral Component Interconnect Express (PCI Express), a switch fabric, High Definition Multimedia Interface (HDMI), Recommended Standard 232 (RS-232), and radio frequency wireless networks.

The interface controller 108 is capable of translating USB packet data to data that can be written to the storage media 112 in a USB flash-memory-based drive (or other types of data storage media). In some example embodiments, the interface controller 108 is not operational until the authentication subsystem 104 has authenticated the user 122, that is, the encryption engine 110 will not encrypt or decrypt data and the external communication channel 102 will not transfer any data until the user 122 is authenticated.

The encryption engine 110 is implemented as part of the interface controller 108 and takes clear text and/or data (information) from the host computer system 120 and converts it to an encrypted form that is written to the MSD or the storage media 112. The encryption engine 110 also converts encrypted information from the storage media 112 and decrypts it to clear information for the host computer system 120. The encryption engine 110 can also be a two-controller subsystem with an encryption controller that has the encryption capability to encrypt/decrypt data on the fly along with managing the communication protocol, memory, and other operating conditions, and a communication/security controller for handling the communication, encryption key management, and communications with the encryption controller.

An encryption key 116 is required by the encryption engine 110 to encrypt/decrypt the information. The encryption key 116 is used in an algorithm (e.g., a 256-bit Advanced Encryption Standard (AES) encryption) that respectively encrypts/decrypts the data by an encryption algorithm to render data unreadable or readable. The encryption key 116 can be stored either internally or externally to the authentication controller 114.

The encryption key 116 is transmitted to the encryption engine 110 by the authentication subsystem 104 once a user 122, having an identification number or key, has been verified against an authentication key 118.

It has been discovered that, by the employment of the authentication key 118 and the encryption key 116, portable memory storage devices of the various embodiments of the present invention can provide an extremely high level of security previously not available in other such devices.

When the data security system 100 is locked, the authentication key 118 remains inside the authentication subsystem 104 and cannot be read from outside. One method of hiding the authentication key 118 is to store it in the authentication controller 114 in the authentication subsystem 104. Setting the security fuse of the authentication controller 114 makes it impossible to access the authentication key 118 unless the authentication controller 114 allows retrieval once the user 122 has been verified. Many micro-controllers come equipped with a security fuse that prevents accessing any internal memory when blown. This is a well-known and widely used security feature. Such a micro-controller could be used for the authentication controller 114. The authentication controller 114 can be a micro-controller or microprocessor.

The authentication key 118 can be used as in several capacities: 1. As the encryption key 116 to encrypt/decrypt the information directly. 2. As a key to recover the encryption key 116 stored in the data security system 100 that can be accessed by the interface controller 108. 3. Used for direct comparison by the interface controller 108 to activate the external communication channel 102.

Figure 2A:
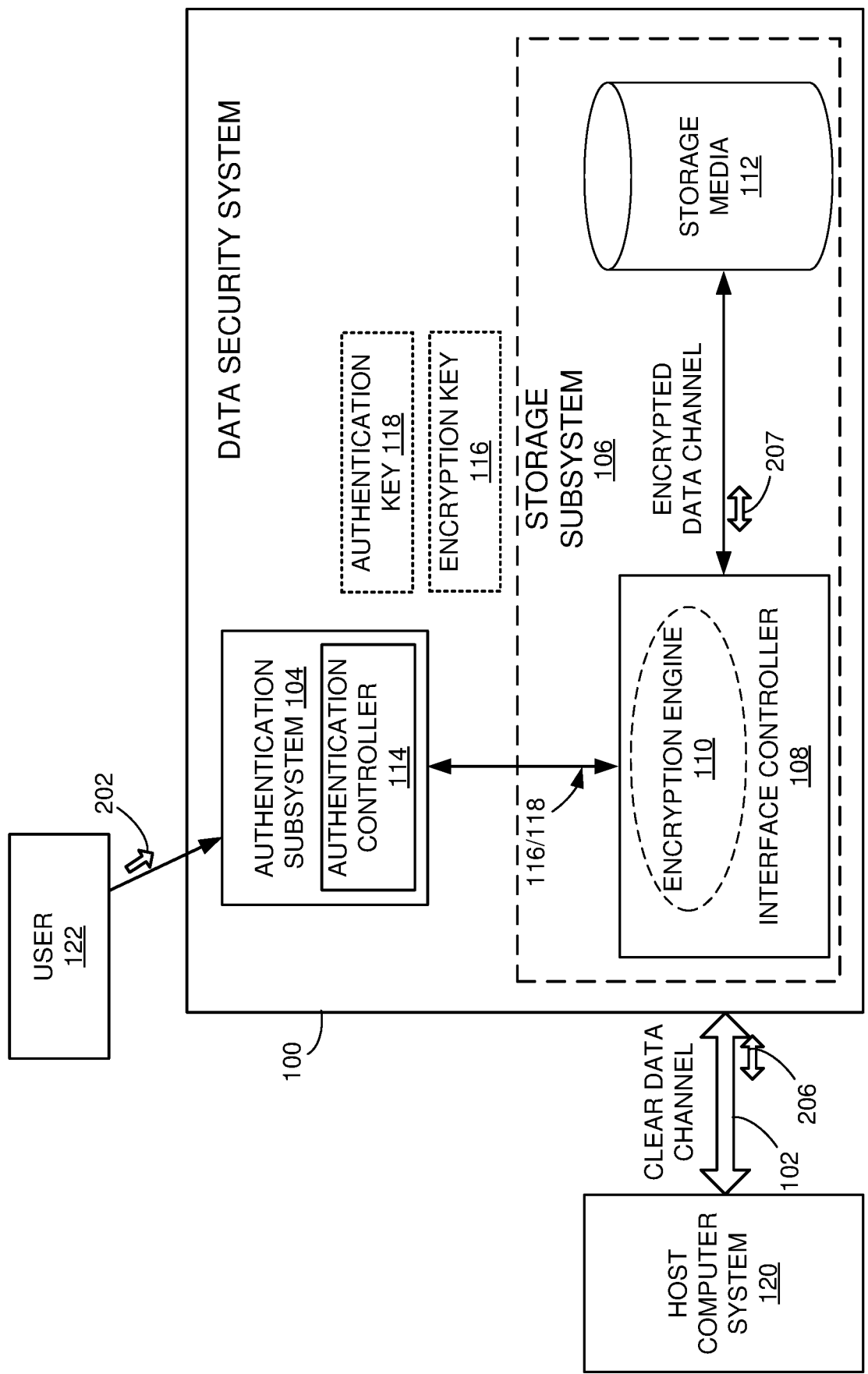
FIG. 2A is an illustration of an authentication key delivery method used with the data security system.

Referring now to FIG. 2A, therein is shown an illustration of an authentication key delivery method used with the data security system 100. In this illustration, the authentication key 118 and the encryption key 116 are one and the same. The encryption engine 110 employs the authentication key 118 as the encryption key 116. In other example embodiments, the authentication key 118 and the encryption key 116 are different and independent from each other.

The user 122 interacts with the authentication subsystem 104 by providing user identification 202, a number or key, to the authentication subsystem 104. The authentication subsystem 104 validates the user 122 against the authentication key 118. The authentication subsystem 104 then transmits the authentication key 118 as the encryption key 116 to the interface controller 108.

The encryption engine 110, in the interface controller 108, employs the encryption key 116 to convert clear information to encrypted information and encrypted information to clear information along a data channel 206-207. Clear data channel 206 is used to exchange clear data, and encrypted data channel 207 is used to exchange encrypted data. Any attempt to read encrypted information from the storage media 112 without the encryption key 116 will generally result in information that is unusable by any computer.

Figure 2B:
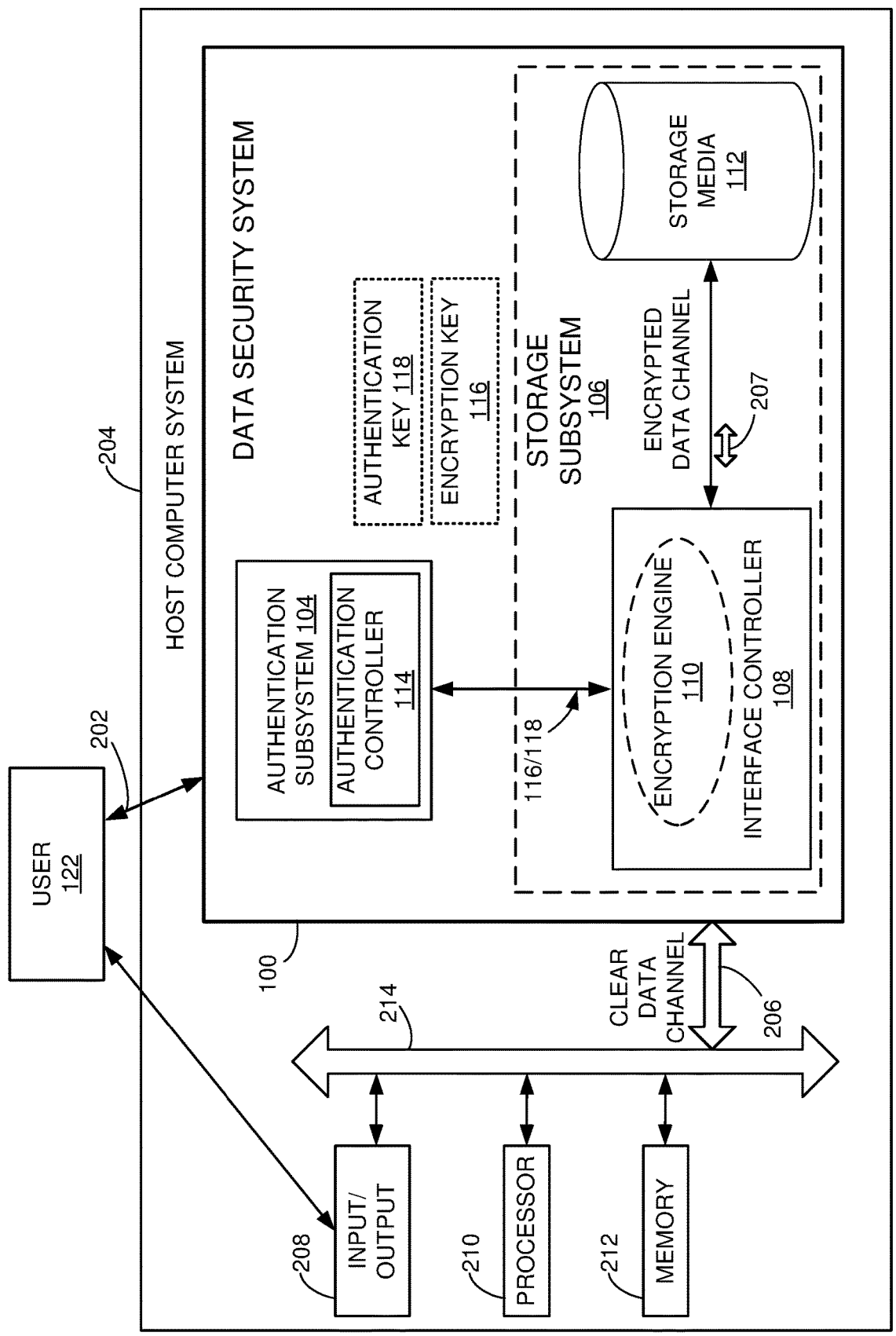
FIG. 2B is an illustration of an architecture for a self-encrypting drive (SED) situated inside a host computer system.

FIG. 2B is an illustration of an architecture for a self-encrypting drive (SED) situated inside a host computer system 204. The host computer system 204 includes the data security system 100, as well as other host components, such as input/output devices 208, a processor 210, and a memory 212.

The data security system 100 is being used as a self-encrypting drive, and the data security system 100 interfaces directly with the user 122 for authenticating the user 122 so the data security system 100 may be accessed through the clear data channel 206 (e.g., internal bus 214). Although the data security system 100 may be situated within the computer casing of the host computer system 204, or may be attached to the host computer system, and the data security system 100 may be upgraded or replaced, the data security system 100 is still independent from the host computer system 204 for authenticating the user 122.

Other solutions for SEDs store the encryption key on the storage media 112 or inside a communications controller, but this type of implementation is susceptible to attack because the user-authentication information is still going thru the host computer and the encryption key may be obtained by brute force or by other means, just by reading the storage media or the communications controller. Because the authentication is provided through the communications controller, in these other solutions, the encryption key that is stored therein may be hacked.

On the other hand, in the data security system 100, the clear data channel 206 is completely locked until the user is authenticated. In some example embodiments, the storage subsystem 106 is not powered until the user is authenticated. Further, the data security system 100 does not keep the encryption key 116 inside the encryption engine 110 of the interface controller 108. Once the user is authenticated, the encryption key 116 is sent from the authentication subsystem 104 to the encryption engine 110.

FIG. 2C illustrates a method for unlocking the SED inside a laptop. At operation 222, the SED is locked (e.g., the user has not authenticated the SED yet); when the user powers up a laptop 228, the laptop 228 tries to find a boot drive, but since the SED is locked, the laptop 228 does not find any bootable devices 230. When the SED is locked, the SED does not provide the data interface to the host, so the host is not aware of the existence of the SED; in other words, the internal SED is "invisible" to the host. Physically, the SED is in the host, but logically the SED does not "exist" in the host as long as the data channel is locked. From a security point of view, this invisibility is beneficial because it is not possible to attack something you don't see. Once the SED is unlocked, the SED becomes visible and provides internal storage for the host.

Afterwards, the user unlocks (operation 224) the SED via a mobile app executing on a mobile device 232. The mobile app is used to enter authentication via wireless connection to the SED, as described in more detail below. The wireless connection to the SED may be protected with its own independent encryption layer.

After the SED is enabled (operation 226), the laptop 228 is able to boot 234, and the SED behaves as a regular hard drive. The software and the hardware in the laptop 228 is not aware that the SED is different from any regular hard drive, and no special software or hardware is required to support the SED in the laptop 228.

Additionally, for security reasons, the SED may be locked, even when the operating system in the laptop 228 is up and running. The remote management system may send a command (e.g., via the mobile device 232) to lock the SED. For example, if an administrator has detected malicious activity, the administrator may send a command to lock the SED immediately, the operating system would report the failure of the hard drive, and the laptop 228 will not be operational anymore. In some cases, when there is not an urgent threat, the remote lock may be sent with a timer (e.g., five minutes) to enable the user to close files and maybe power down the laptop 228; when the timer expires, the SED is locked. In some example embodiments, the SED may generate a shutdown signal of the laptop 228 for the laptop to shut down before the SED is locked.

During a malicious attack, the attacker may take out the SED and read the data in the media to look for the encryption. With prior solutions, the hacker may gain access to the media. However, the SED described herein, when locked, does not provide a data channel to give access to the storage media, so the attacker may not use brute force to read the media.

In some cases, the remote management system may send a remove wipe (remote reset, remote kill) command to the SED, and the SED will not only lock the communication channel, but also delete the encryption key (in some cases, the SED is zeroized). Since the encryption key is never made available outside the SED, no other user or entity will have the encryption key and the data in the SED will not be accessible (unless the attacker is able to break the encryption, which is an almost impossible task given the computing resources currently required to break long encryption keys).

Figure 3A:
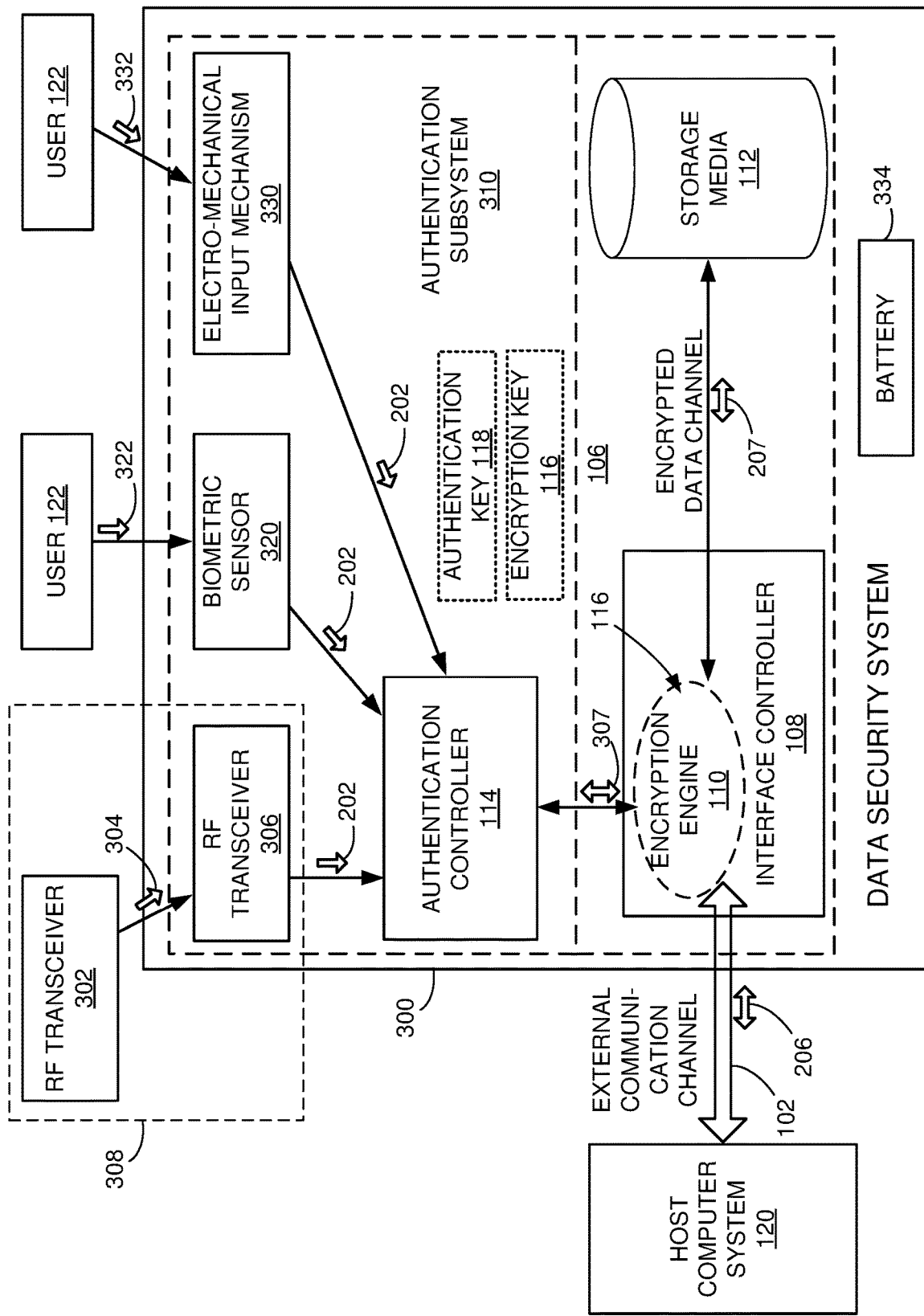
FIG. 3A is an illustration of different systems for the user to interact with the data security system.

Referring now to FIG. 3A, therein is shown an illustration of different systems for the user 122 to interact with a data security system 300. The interaction can be by a communication combination, which can be by a physical contact, wired connection, or wireless connection from a cell phone, smartphone, smart watch, wearable appliance, or other wireless device.

In one method for wireless authentication 308, a mobile transceiver 302 (e.g., in a mobile phone, tablet, a key-fob, etc.) is employed to transmit user identification 304 to a data security transceiver 306 in an authentication subsystem 310. For exemplary purposes, transceivers are employed for bi-directional communication flexibility, but a transmitter-receiver combination for uni-directional communication could also be used.

The authentication subsystem 310 includes the authentication controller 114, which is connected to the interface controller 108 in the storage subsystem 106. The user identification 304 is supplied to the data security transceiver 306 within the authentication subsystem 310 by the mobile transceiver 302 from outside the storage subsystem 106 of the data security system 300. The wireless communication may include Wireless Fidelity (WiFi), Bluetooth (BT), Bluetooth Smart, Near Field Communication (NFC), Global Positioning System (GPS), optical, cellular communication (for example, Long-Term Evolution (LTE), Long-Term Evolution Advanced (LTE-A)), Code Division Multiple Access (CDMA), Wideband Code Division Multiple Access (WCDMA), Universal Mobile Telecommunications System (UMTS), Wireless Broadband (WiBro), or Global System for Mobile Communications (GSM), and the like.

The authentication subsystem 310 validates the user 122 against the authentication key 118 by a code sent from the mobile transceiver 302 being validated against the authentication key 118. After a successful user authentication validation, the authentication subsystem 310 then transmits the encryption key 116 to the interface controller 108 across the communication channel 307.

The encryption engine 110 then employs the encryption key 116 to convert clear information to encrypted information and encrypted information to clear information along the data channel 206-207. Any attempt to read encrypted information from the storage media 112 without the encryption key 116 will result in information that is unusable by the host computer system 120.

In an optional second authentication mechanism, the authentication subsystem 310 validates the user 122 against the authentication key 118 by having the user 122 employ a biometric sensor 320 to supply a biometric input 322 to verify his/her identity as an authorized user. Types of biometric identification include a fingerprint, an iris scan, a voice imprint, etc.

In an optional third authentication mechanism, the authentication subsystem 310 validates the user 122 against the authentication key 118 by having the user 122 employ an electro-mechanical input mechanism 330 to supply a unique code 332 to verify his/her identity as an authorized user. The unique code 332 can include a numerical, alphanumeric, or alphabetic code, such as a PIN. The electro-mechanical input mechanism 330 is within the authentication subsystem 310. The electro-mechanical input mechanism 330 receives the unique code 332 from the user 122 from outside of the data security system 300. The unique code 332 is supplied to the electro-mechanical input mechanism 330 within the authentication subsystem 310 from outside the storage subsystem 106 of the data security system 300.

No matter which method is used to validate the user 122, the authentication key 118 and the encryption key 116 remain hidden in the authentication subsystem 310 until the user 122 is authenticated, and the interface controller 108 does not have access to the authentication key 118 or the encryption key 116. In some embodiments, the security controller may not even have a power until the user has been authenticated.

In some example embodiments, the data security system 300 includes an internal power source, such as a battery 334. In other example embodiments, the data security system 300 does not include an internal power source and uses the power source provided by the host computer system 120. In other example embodiments, the data security system 300 may use both a power source provided by the host and the internal power source.

Figure 3B:
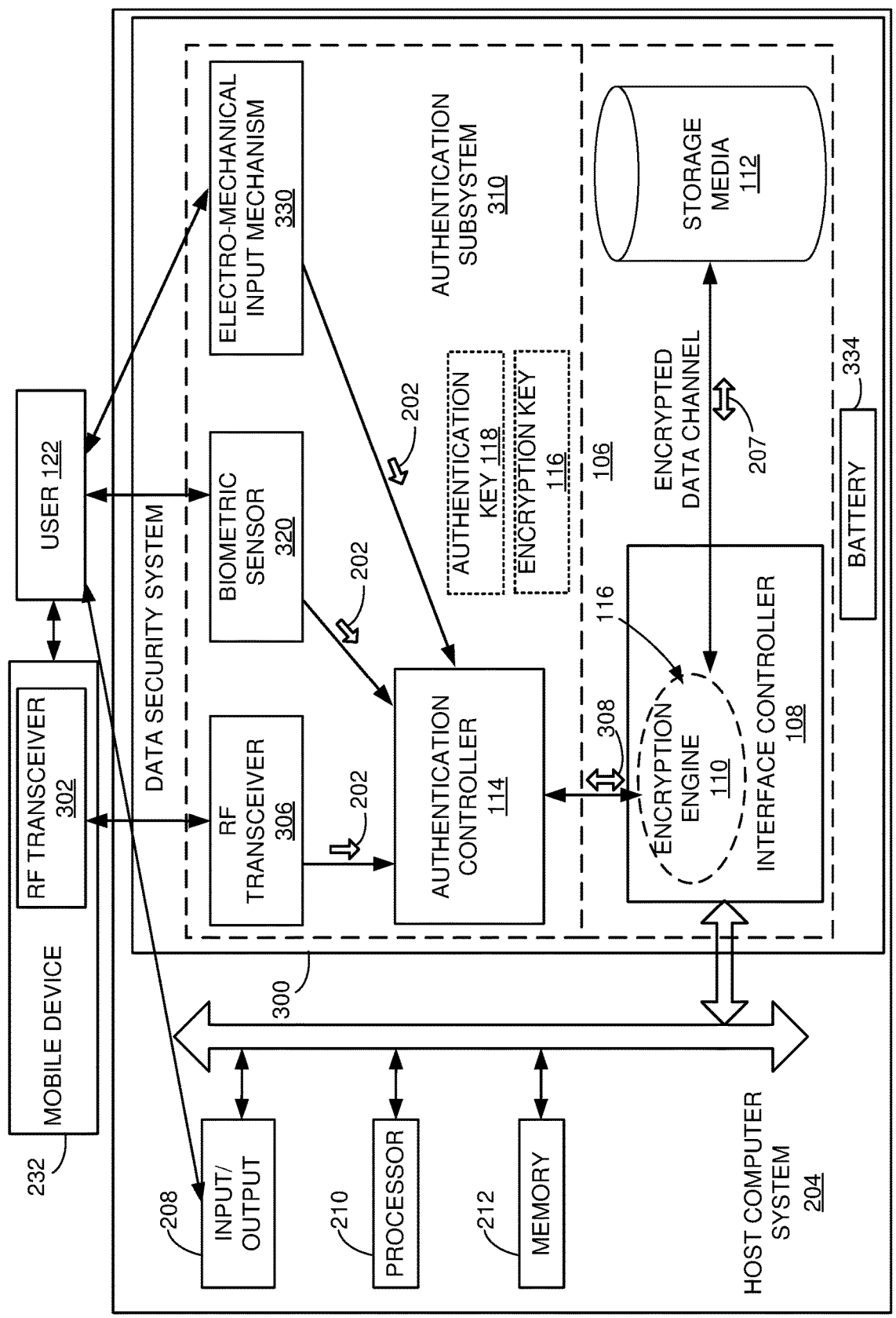
FIG. 3B illustrates the interaction of a mobile device with a host computer system having an SED.

FIG. 3B illustrates the interaction of a mobile device 232 with a host computer system 204 having a data security system 300. The data security system 300, installed inside the host computer system 204, acts as an SED with independent authentication methods that do not rely on other hardware or software of the host computer system 204, such as input/output devices 208, processor 210, and memory 212. The host-independent authentication methods include wireless authentication, biometric authentication, and authentication based on user input received via a keyboard, a keypad, or some other manipulatable input mechanism, that is independent from the host.

Other SED solutions require authentication utilizing the host computer resources (e.g., I/O 208, processor 210, memory 212). For example, in other solutions, the user-authentication information is entered into the host computer system 204 via the input/output devices 208, such as a keyboard or a fingerprint reader.

The user-authentication information is then sent to the SED via the interface controller 108. This means that the interface controller 108 has to be opened (e.g., unlocked) in order to receive the user-authentication information. In the data security system (e.g., SED) 300, the interface controller 108 is completely locked from access by the host computer system 204 until the user 122 is authenticated via the RF transceiver 306, biometric sensor 320, or electro-mechanical input mechanism 330. In some example embodiments, when the interface controller 108 is locked, the host computer system 204 may not even recognize that there is an SED installed in the host computer system 204.

Figure 4:
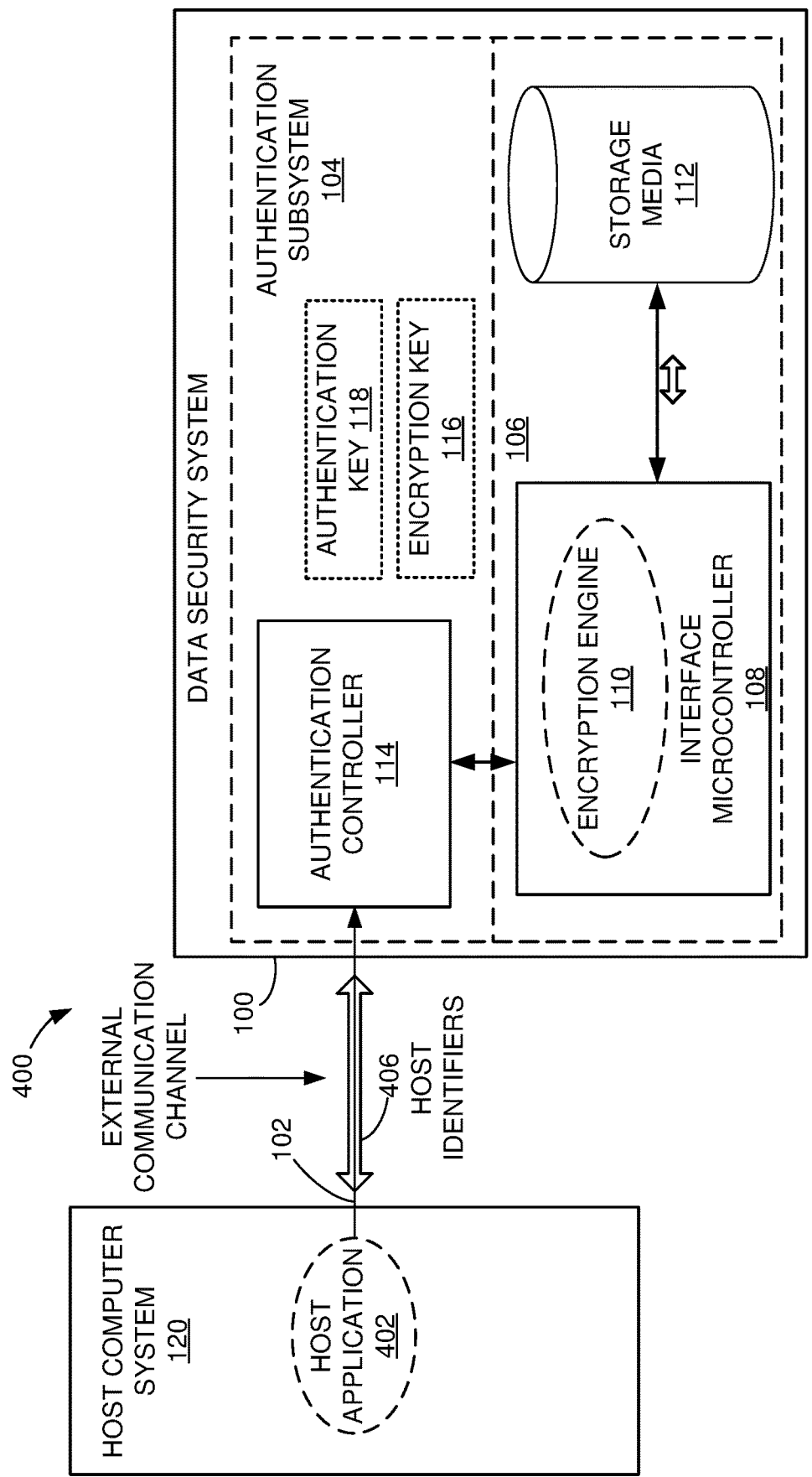
FIG. 4 is an illustration of how the user can employ the host computer system to interact with a data security system.

Referring now to FIG. 4, therein is shown an illustration of how the user 122 can employ the host computer system 120 to interact with a data security system 400.

The host computer system 120 is provided with a host application 402. The host application 402 is software or firmware, which communicates over the external communication channel 102 of the data security system 100.

The host application 402 delivers host identifiers 406, such as internal component serial numbers (e.g., hard drive), media access control (MAC) address of a network card, login name of the user, network Internet Protocol (IP) address, an ID created by the data security system 100 and saved to the host, an ID created by the data security system 100 and saved to the network, etc., associated with its environment. The host identifiers 406 are employed by an authentication subsystem 408 in the data security system 100.

When the authentication subsystem 408 validates the user 122 against the authentication key 118 by verifying the host identifiers 406, the data security system 100 will unlock.

For example, the user 122 connects the data security system 100 that is locked to the host computer system 120. The host application 402 sends the MAC address of its network card to the data security system 100. The data security system 100 recognizes this MAC address as legitimate and unlocks without the user 122 of FIG. 1 having to enter user identification. This implementation does not require any interaction with the user 122. In this case, it is the host computer system 120 and its associated environment that are being validated.

The data security system 100 includes: providing the authentication key 118 stored in the authentication subsystem 104; providing verification of the host computer system 120 by the authentication subsystem 104; presenting the encryption key 116 to the storage subsystem 106 by the authentication subsystem 104; and providing access to the storage media 112 by the storage subsystem 106 by way of decrypting the storage media content.

The data security system 100 further includes the authentication subsystem 104 for interpretation of biometric input and verification of the user 122.

The data security system 100 further includes using the authentication key 118 as the encryption key 116 directly.

The data security system 100 further includes using the authentication key 118 to decrypt and retrieve the encryption key 116 used to decipher internal content.

The data security system 100 further includes the authentication subsystem 104 for interpretation of signal inputs and verification of sending unit.

The data security system 100 further includes the authentication subsystem 104 for interpretation of manually entered input and verification of the user 122.

The data security system 100 further includes the authentication subsystem 104 for interpretation of input sent by a host resident software application for verification of the host computer system 120.

The data security system 100 further includes the encryption engine 110 outside the interface controller 108 but connected to the external communication channel 102 for the purpose of converting clear data to encrypted data for unlocking the data security system 100.

Figure 5:
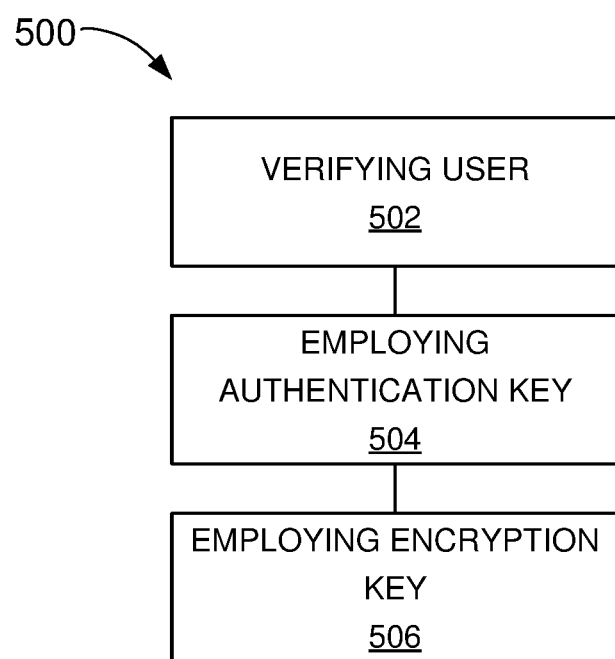
FIG. 5 is a data security method employing user verification for the data security system.

Referring now to FIG. 5, therein is shown a data security method 500 employing user verification for the data security system 100. The data security method 500 includes; verifying the user against an authentication key in a block 502; employing the authentication key for retrieving an encryption key in a block 504; and employing the encryption key for allowing unencrypted communication through a storage subsystem between a host computer system and a storage media in a block 506.

Figure 6A:
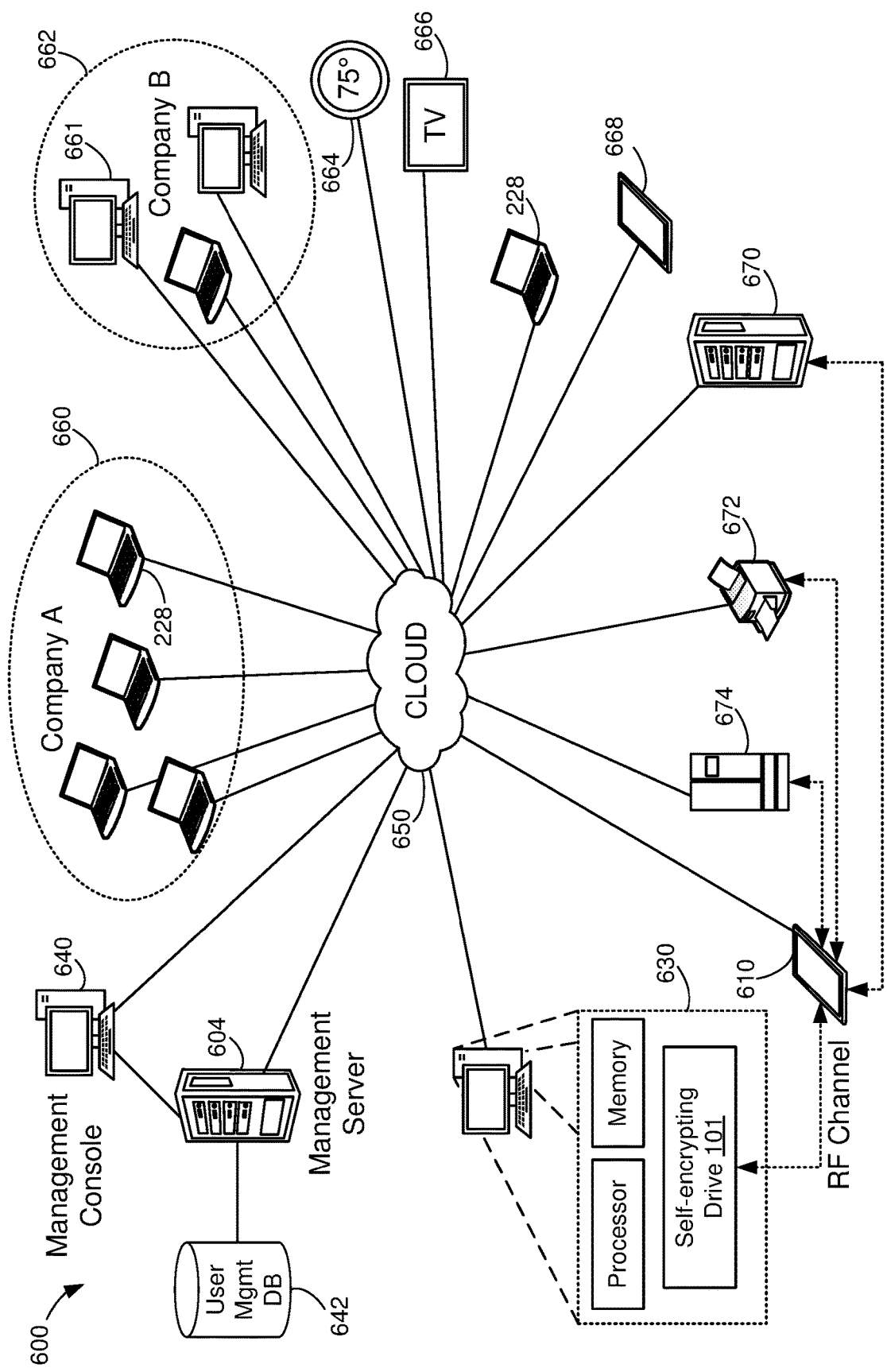
FIG. 6A illustrates a management architecture for remote management of devices with encryption capabilities.

FIG. 6A illustrates one of the possible embodiments for a management architecture 600 for remote management of devices with encryption capabilities. A management server 604, that includes a user management database 642, provides remote management, including remote security, of devices via a network, such as a cloud 650. A management console 640 may connect to the management server 604, directly (e.g., USB port) or via the cloud 650. Although a management server 604 is illustrated, the implementation of the management server 604 may be distributed across one or more servers that cooperate to provide the required management capabilities.

The management console 640 may be used to access several user interfaces for configuring the remote management, such as interfaces for managing accounts, users, drives, enforcing IT policies, etc. Some user interfaces are described below with reference to FIGS. 16-21.

The user management database 642 stores information regarding users and devices. More details for the user management database 642 are provided below with reference to FIGS. 6D and 6E.

The management server 604 may manage a plurality of devices, such as laptops 228, PCs 661, thermostats 664, smart TVs 666, tablets 668, servers 670, printers and scanners 672, smart appliances 674, mobile devices 610, and other devices, such as residence doors, elevator doors, garage doors, hotel doors, office room doors, water supply valves, meters, medical devices, medicine cabinets, safes, home and corporate security and access-control systems, home automation devices, smart speakers, voice-mail systems, etc. Some devices may belong to the same company, such as the laptops of Company A 660 or the devices for Company B 662.

For example, the remote management server 604 may control the access to an SED 101, as described above.

Further, the remote management server 604 may control different types of motors that can open or close a door or a safe, provide controlled access to video security cameras and their recorded video, etc.

Remote management may be used for different types of services, such as secure-access control systems, home automation and security systems, healthcare and medical devices, external and internal data storage devices, etc.

The management server 604 communicates with the mobile device 610 to control the use of the SED 101 inside host computer 630. The application executing in mobile device 610, as described above with reference to FIG. 4, communicates with the management server 604 to enable access to the SED 101, once the user authentication enables access to the SED 101, as managed by the management server 604.

Figure 6B:
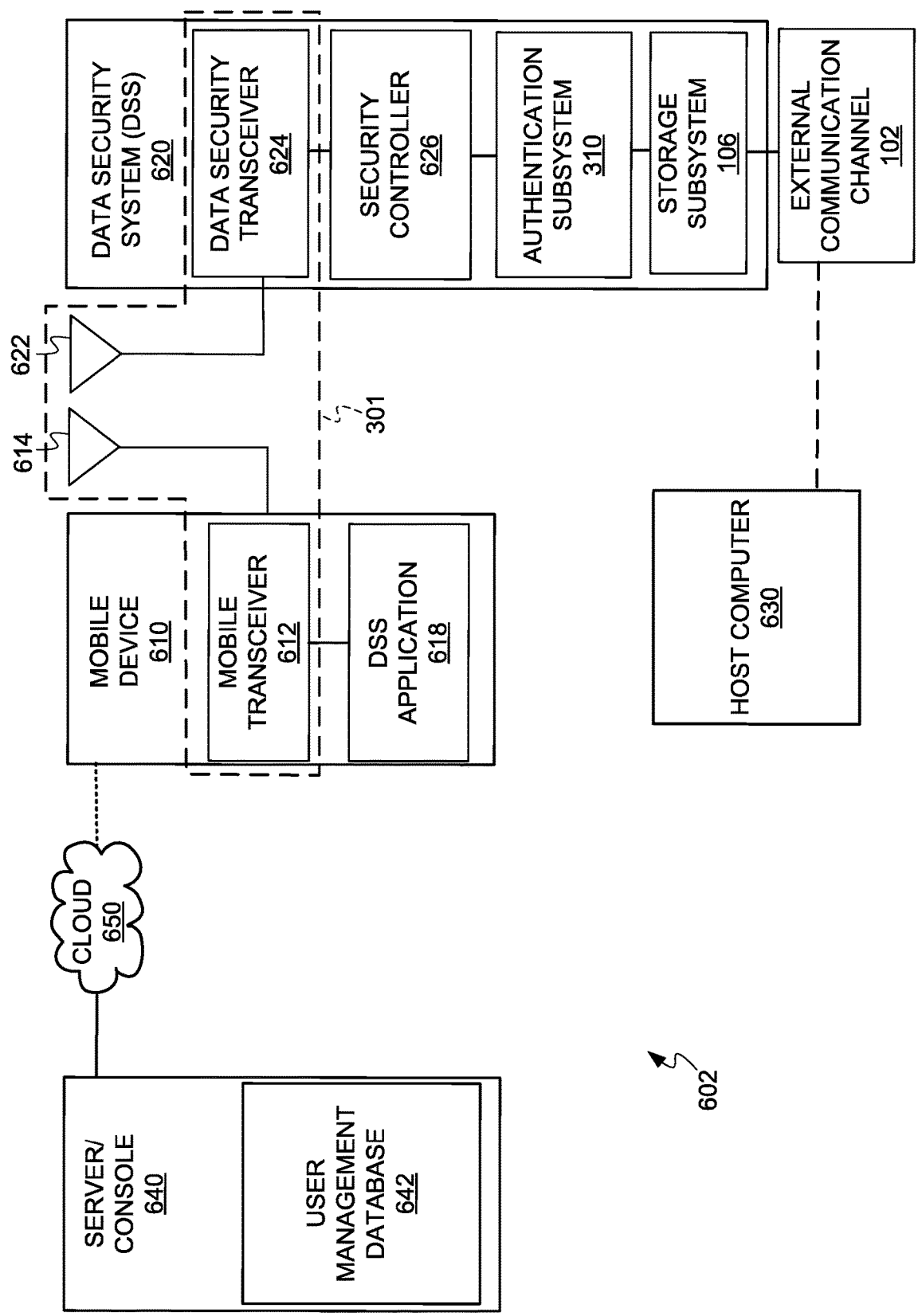
FIG. 6B is an exemplary data security communication system.

Referring now to FIG. 6B, therein is shown an exemplary data security communication system 602. The exemplary data security communication system 602 includes a mobile device 610, a data security system 620, a host computer 630, and a server/console 640. The mobile device 610 and the server/console 640 are connected by wired or wireless connections through a cloud 650, which can be an Internet cloud. The mobile device 610 and the data security system 620 are connected by a communication combination 301.

The communication combination 301 in the exemplary data security communication system 602 includes a mobile transceiver 612 in the mobile device 610 with an antenna 614 wirelessly communicating with an antenna 622 of a data security transceiver 624 in the data security system 620.

The mobile device 610 in one embodiment can be a smartphone. In the mobile device 610, the mobile transceiver 612 can be connected to conventional mobile device components and to a data security system application 618, which provides information to be used with the data security system 620.

The data security transceiver 624 is connected to a security controller 626, which can contain identification, passwords, profiles, or information including that of different mobile devices that can access the data security system 620. The security controller 626 is connected to subsystems similar to the authentication subsystem 310, the storage subsystem 106 (which in some embodiments can have encryption to encrypt data), and the external communication channel 102.

The external communication channel 102 is connectable to the host computer 630 to allow, under specified circumstances, access to data in the storage sub system 106.

One implementation of the data security system 620 can eliminate the biometric sensor 320 and the electro-mechanical input mechanism 330 of FIG. 3A with only a wireless link to the mobile device 610, such as a smartphone. It has been found that this implementation makes the data security system 620 more secure and useful.

The data security system application 618 allows the mobile device 610 to discover all data security systems in the vicinity of the mobile device 610 and show their status (locked/unlocked/blank, paired/unpaired etc.).

The data security system application 618 allows the mobile device 610 to connect/pair, lock, unlock, change the name and password, and reset all data on the data security system 620.

The data security system application 618 allows the mobile device 610 to set an inactivity auto-lock so the data security system 620 will automatically lock after a predetermined period of inactivity or to set a proximity auto-lock so the data security system 620 will be locked when the mobile device 610 is not within a predetermined proximity for a predetermined time period (to improve reliability and avoid signal de-bouncing).

The data security system application 618 allows the mobile device 610 to remember a password, use TouchID, and Apple Watch (both TouchID and Apple Watch mentioned here as examples only, there are many other mobile devices with biometric sensors and wearables that can be used in a similar mode) so data security system 620 can be unlocked without entering re-entering a password on the mobile device 610.

The data security system application 618 allows the mobile device 610 to be set to operate only with a specific mobile device, such as the mobile device 610, so the data security system 620 cannot be unlocked with other mobile devices (IPhone).

The data security system application 618 allows the mobile device 610 to set the data security system 620 to Read-Only.

The data security system application 618 allows the mobile device 610 to be operated in User Mode or Administrator Mode (administrator's mode overrides user's settings) and use the server/console 640. The server/console 640 is a combination of a computer with a console for entering information into the computer.

The server/console 640 contains a user management database 642, which contains additional information that can be transmitted over the cloud 650 to the mobile device 610 to provide additional functionality to the mobile device 610.

The user management database 642 allows the server/console 640 to create and identify users using UserID (username and password), to lock or unlock the data security system 620, and to provide remote help.

The user management database 642 allows the server/console 640 to remotely reset or unlock the data security system 620.

The user management database 642 allows the server/console 640 to remotely change the data security system user's PIN.

The user management database 642 allows the server/console 640 to restrict/allow unlocking data security system 620 from specific locations (e.g., by using geo-fencing).

The user management database 642 allows the server/console 640 to restrict/allow unlocking data security system 620 in specified time periods and different time zones.

The user management database 642 allows the server/console 640 to restrict unlocking data security system 620 outside of specified team/organization/network, etc.

Figure 6C:
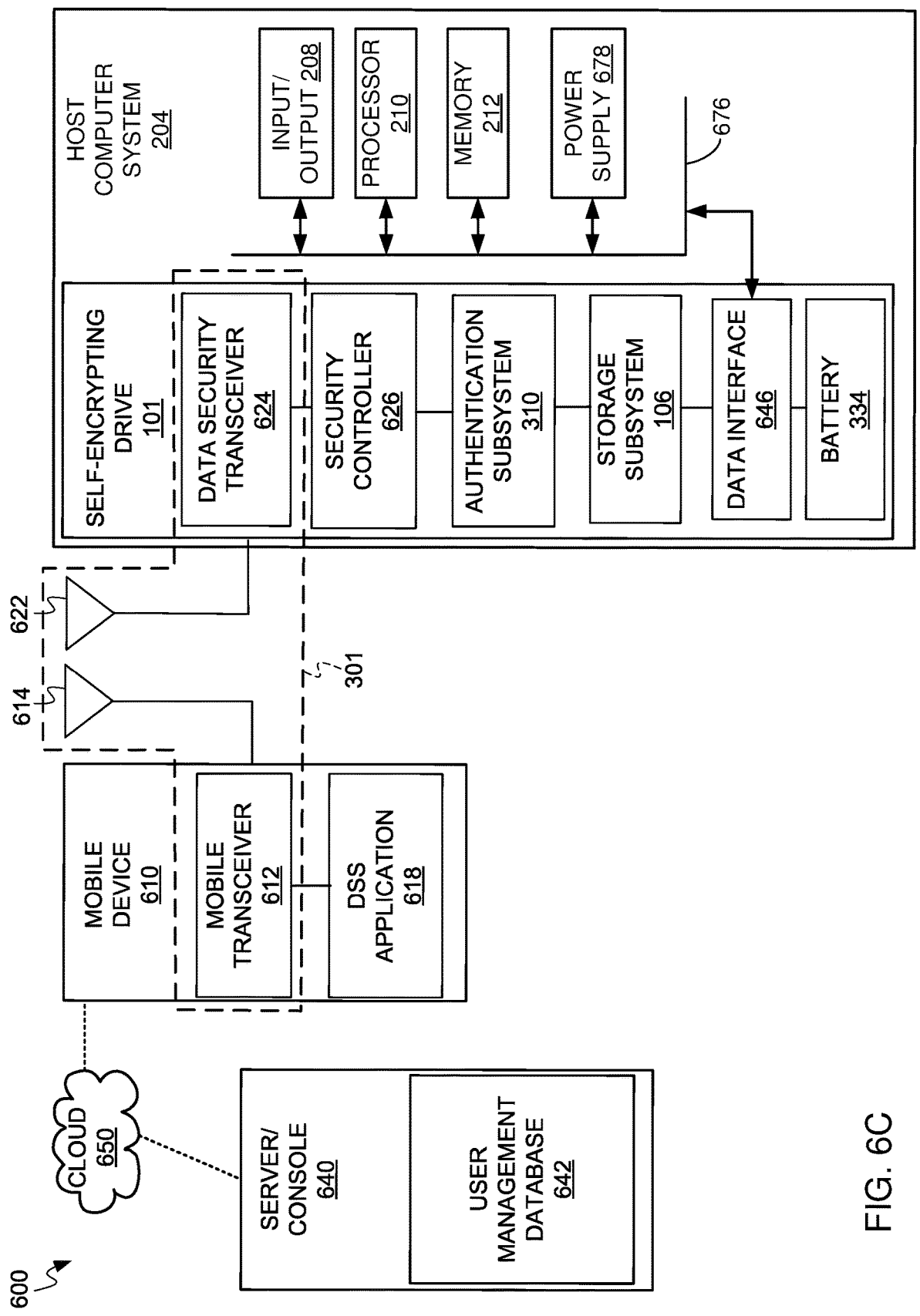
FIG. 6C is another data security communication system with embedded SED.

FIG. 6C is another data security communication system with embedded SED 101. Host computer system 204 includes an SED 101, which includes the data security transceiver 624, the security controller 626, the authentication subsystem 310, and the storage subsystem 106, as described in FIG. 6B for data security system 620. Additionally, the SED 101 includes a data interface 646 and may include an internal power supply (e.g., a battery 334).

The data interface 646 is used to communicate with other components of the host computer system 204, via data channel 676, such as I/O 208, processor 210, memory 212, and power supply 678. In some example embodiments, the battery 334 is not included in the SED 101, and the SED 101 may utilize the power supply 678 of the host computer (or overall embedded) system 204.

As described above with reference to FIG. 6B, the data security transceiver 624 may be used to authenticate the SED 101. In some example embodiments, the data interface 646 remains locked (e.g., no data is sent out or received via the data interface 646) until the user is authenticated.

Figure 6D:
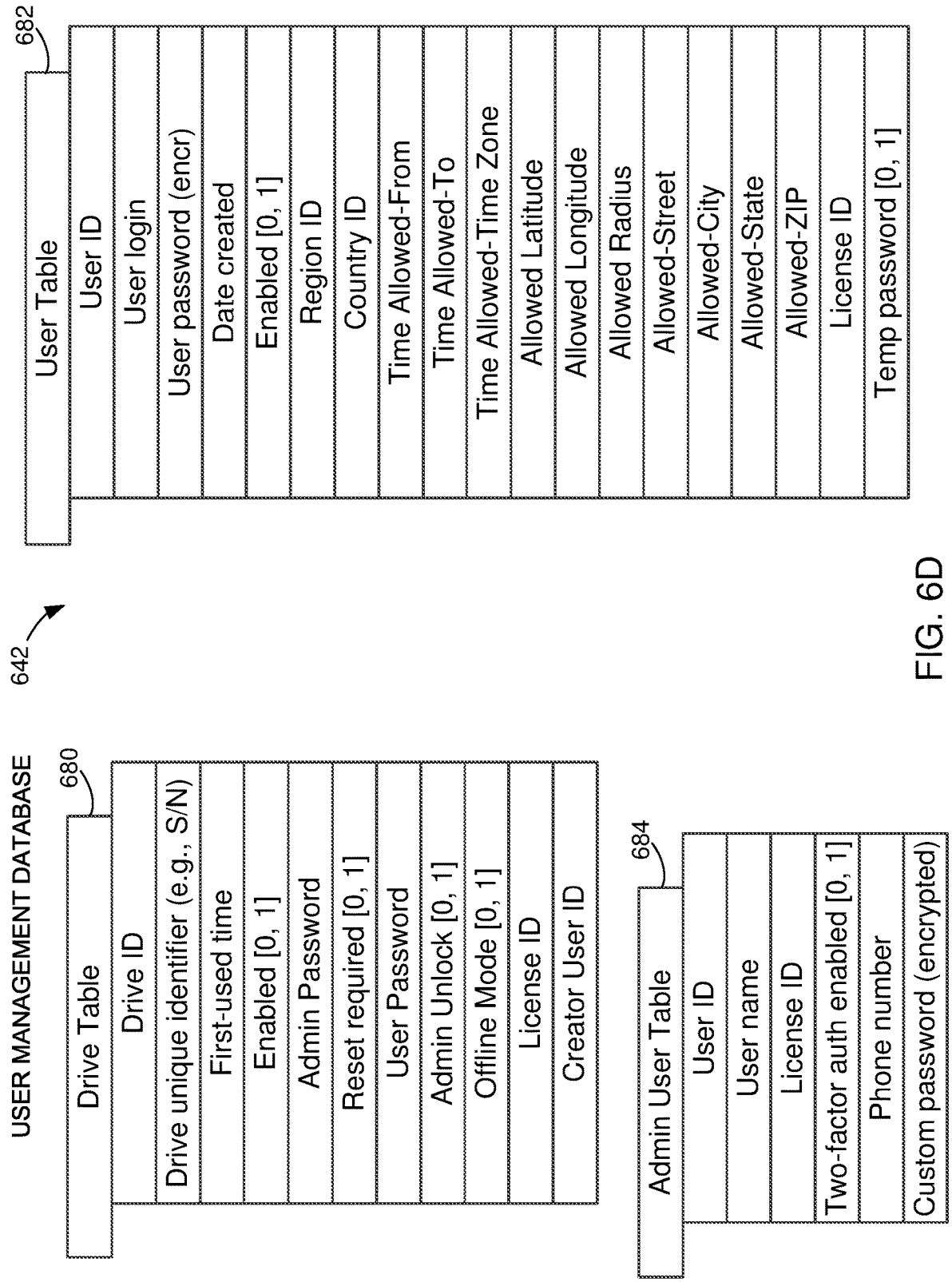
FIGS. 6D-6E illustrate the organization of the user management database, according to some example embodiments.
Figure 6E:
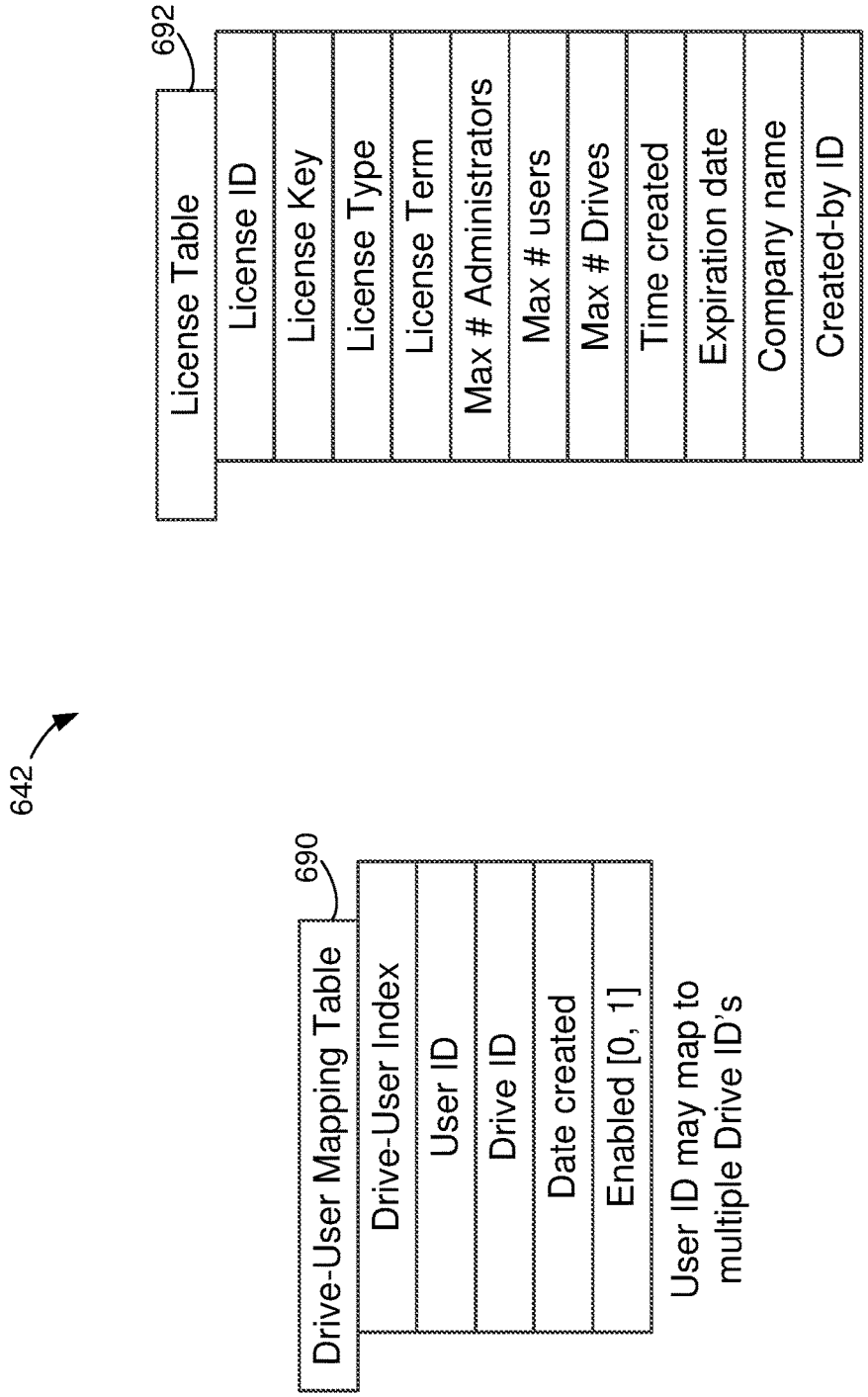

FIGS. 6D-6E illustrate the organization (e.g., configuration) of the user management database 642, according to some example embodiments. In some example embodiments, the user management database 642 includes a drive (managed device) table 680, a user table 682, an administrator user table 684, a drive-user mapping table 690, and a license table 692.

The drive table 680 stores information about the drives manage by the remote management server. The drive table 680 includes the following fields:

Drive Identifier (ID) that is one or more unique identifiers for each drive in the system (e.g., 1, 2, 3, 4). This is an internal value used by the remote management architecture;

Drive unique identifier (e.g., the serial number) is a unique identifier that differentiates each drive (managed device) from any other drives in the world. For example, the drive unique identifier may be the serial number. Some examples are UAC_DI_1_012896, UAC_DI_1_0b6d2222, etc.;

First-use time, which is the time when the drive was first used (e.g., 2016-03-01 14:05:36/5820275);

Enabled, which is a binary flag indicating if the managed drive is enabled for use. If the drive is not enabled, the managed drive will not operate and the user will not be able to authenticate the drive until the drive is enabled;

Administrative password, which may be a string of characters including letters, number, and/or other characters;

Reset required, which is a binary flag indicating if the reset is required for the managed drive;

User password, which may be a string of characters including letters, number, and/or other characters;

Administrator unlock, which is a binary flag indicating if there is a pending unlock request generated by the administrator;

Offline mode, which is a binary flag indicating if the drive is online or offline;

License identifier (ID), which is a string of characters containing the license assigned to the drive by the remote management system; and Creator user ID that identifies the user that added the drive to the system.

The user table 682 stores information for each of the users authorized by the remote management system. The user table 682 includes the following fields:

The user identifier (ID) that uniquely identifies each of the users (e.g., 1, 2, 3, 27) in the remote management system;

The user login, which is the login used by the user to gain access to the remote management system (e.g., joe47, angela, mark, pepe9675@email.com);

The user password, which is stored in encrypted form;

The date the user was created in the system;

Enabled, which is a binary flag indicating if the user is currently enabled or disabled in the system;

A region ID, which identifies the region where the user is enabled. The region may be an area within the world (e.g. continent, country, state, county, zip code, etc.), or the complete world;

A country ID, which identifies the country where the user is enabled. If no country is specified, the user may operate in any country;

A time allowed-from, which indicates a lower boundary for the date/days/hours when the user is authorized to access one or more drives;

A time allowed-to, which indicates the upper boundary for the date/days/hours when the user is authorized to access one or more drives;

A time allowed time zone, which indicates the time zone associated with the time of use boundaries;

An allowed latitude;

An allowed longitude;

An allowed radius that, together with the allowed latitude and the allowed longitude, defines a region of the world where the user is enabled to operate;

An allowed street;

An allowed city;

An allowed state;

An allowed ZIP code that, together with the allowed street, allowed city, and allowed state, defines a place where the user may operate (e.g., a workplace);

A license ID; and

A temporary password flag, which is a binary flag indicating if the password is temporary and must be changed.

As described above, the geographic fencing (e.g., boundaries) as well as the time-of-use boundaries are defined for each user. In other example embodiments, the geographic and time limitations may be defined by drive, which means that a particular drive may only be used in the area and/or time allowed.

The administrator user table 684 is a table for storing information regarding the users that are authorized to operate as administrators for their respective accounts. The administrator user table 684 includes the following fields:

A user ID of the administrator. This value links the administrator to the user table 682;

A user name of the administrator;

A license ID for the administrator account;

A binary flag indicating if two-factor authentication is enabled for this administrator;

A phone number of the administrator; and

A custom password for the administrator, which is stored in encrypted form.

In FIG. 6E, the drive-user mapping table identifies which drives may be used by each user. There is an entry for each unique mapping of user to drive. Therefore, if a user is enabled for the use of three different drives, the drive-user mapping table 690 will have three entries with the same user ID, each of the entries mapping the user to a different drive ID.

The drive-user mapping table 690 includes the following fields:

A drive-user index that uniquely identifies each mapping of user to drive (e.g., 101, 102, 103, etc.);

A user ID of the user (e.g., the user ID of user table 682);

A drive ID of the drive (e.g., the drive ID of the drive table 680);

A date when the entry was created; and

An enabled indicator, which is a binary flag indicating if the mapping of user to drive is enabled.

The license table 692 stores information regarding the licenses given to users for accessing the remote management system, including accessing the configured drives, such as activation codes, when the license was issued, to whom the license was issued, duration of the license, etc. The license table 692 includes the following fields:

A license identifier (ID), which uniquely identifies each of the licenses within the remote management system (e.g., a license index);

A license key, which is a string value that indicates the license (e.g., FE284567B23EA8648648940DE). This license key is given to the user and gives the user different capabilities in the system according to the license type;

A license type, which indicates the type of license that the user has purchased. The license types may include one or more of master (complete access), test (limited to testing functions), personal (given to a user), company (assigned to all the users of a company), temporary (having a limited time of use and/or number of drives, and/or users, and/or admins), etc.;

A license term, which indicates the amount of time left on the license (e.g., 255 days);

A maximum number of administrators that can be configured for this license (e.g., one, five, etc.);

A maximum number of users for this license (e.g., 100);

A maximum number of drives covered by this license (e.g., 50);

A time when the license was created;

A time when the license is to expire;

A company name associated with the license; and

A user ID of the user that created the license.

It is noted that the embodiments illustrated in FIGS. 6D and 6E are examples and do not describe every possible embodiment. Other embodiments may utilize different tables, additional tables, combine tables, etc. The embodiments illustrated in FIGS. 6D and 6E should therefore not be interpreted to be exclusive or limiting, but rather illustrative.

Figure 7:
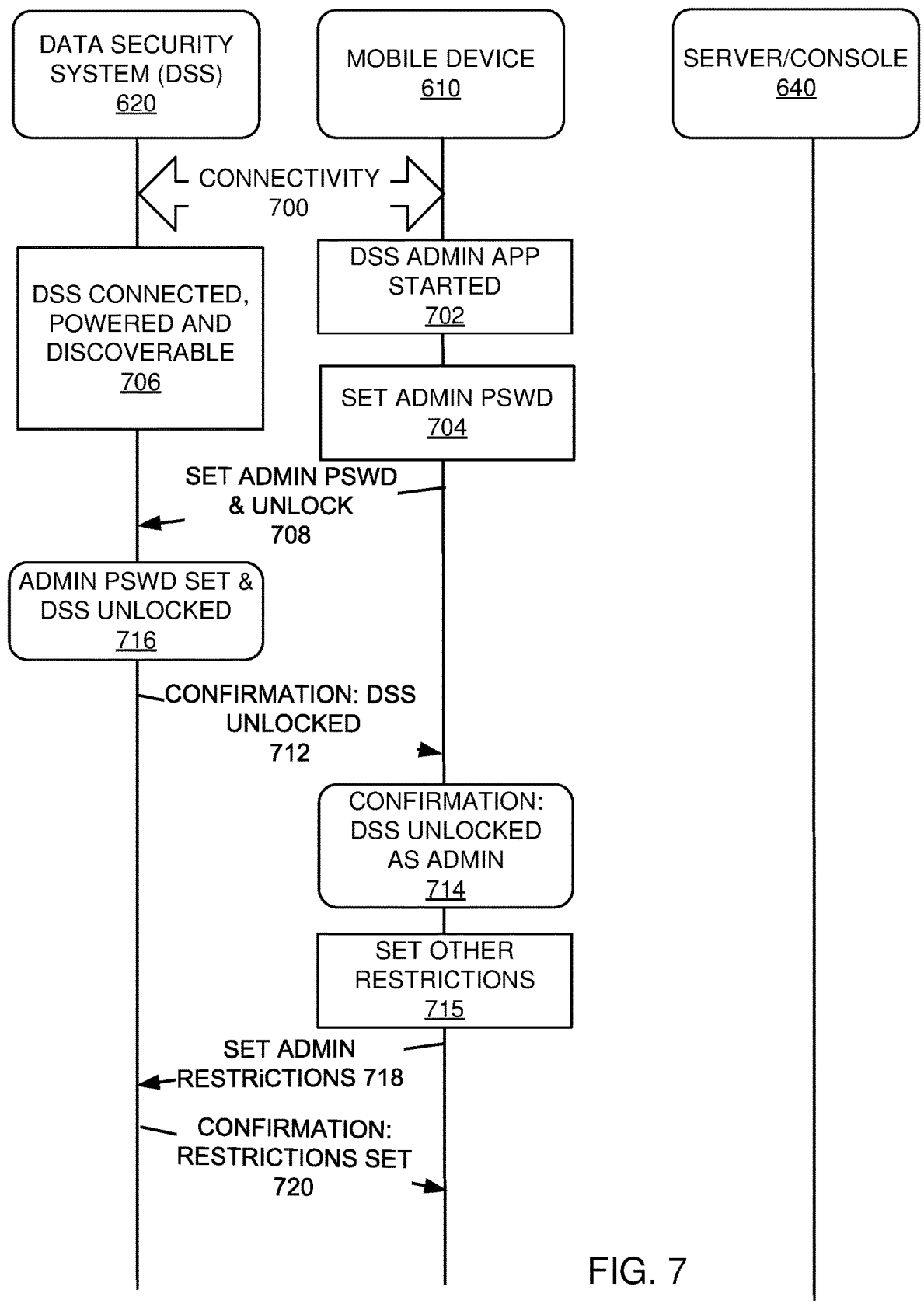
FIG. 7 is an administrator sequencing diagram showing the sequence of operations between a mobile device and the data security system.

Referring now to FIG. 7, therein is shown an administrator sequencing diagram showing the sequence of operations between the mobile device 610 and the data security system 620.

Connectivity 700, between the data security system 620 and the mobile device 610, is first established with mutual discovery of the other device or system, pairing the device and system, and connection of the device and system. The connectivity 700 is secured using a shared secret, which is then used to secure (encrypt) communications between the data security system 620 and the mobile device 610 for all future communication sessions. A standard encryption algorithm is selected to be both efficient to run on the data security system 620 and to be approved by world-wide security standards.

The connectivity 700 is maintained by the data security system application 618 or the security controller 626 or both operating together as long as the data security system 620 and the mobile device 610 are within a predetermined distance of each other. Further, if the predetermined distance is exceeded, the connectivity 700 is maintained for a predetermined period of time after which the data security system 620 is locked.

After connection of the mobile device 610 and the data security system 620, a data security system administrator application start operation 702 occurs in the mobile device 610. Then an administrator sets a password in an administrator password operation 704. Also, after connection of the mobile device 610 and the data security system 620, the data security system 620 is connected to the host computer 630 of FIGS. 6A and 6B to be powered up and discoverable by the host computer 630 in a data security system connected, powered, and discoverable operation 706.

After the administrator password operation 704, the mobile device 610 sends a set administrator password and unlock signal 708 to the data security system 620. The set administrator password and unlock signal 708 causes an administrator password set and data security system unlocked operation 716 to occur in the data security system 620.

When the administrator password set and data security system unlocked operation 716 is completed, a confirmation: data security system unlocked signal 712 is sent to the mobile device 610 where a confirmation: data security system unlocked as administrator operation 714 operates. The confirmation: data security system unlocked as administrator operation 714 permits a set other restrictions operation 715 to be performed using the mobile device 610. The set other restrictions operation 715 causes a set administrator restrictions signal 718 to be sent to the data security system 620 where the administrator restrictions are set and a confirmation: restrictions set signal 720 is returned to the mobile device 610. Thereafter, the mobile device 610 and the data security system 620 are in full operative communication.

Because it is possible to communicate with the data security system 620 without having physical contact with the data security system 620, it is required that significant interactions with the data security system 620 be accompanied by a data security system unique identifier that is either printed on the data security system 620 itself, or that comes with the data security system 620 packaging and is readily available to the data security system 620 owner.

On making requests that could affect user data, such as unlocking or resetting the data security system 620, this unique identifier (unique ID) is required. Attempts to perform these operations without the correct identifier are ignored and made harmless. The unique identifier is used to identify the data security system 620 to the mobile device 610 in a way that requires the user to have physical control over the data security system 620 and to verify the connectivity 700 is established between the authorized, previously paired device and system, such as the mobile device 610 and the data security system 620. Once the devices are paired, the shared secret is used to make the communication confidential.

Pairing connotes that a mobile device and a data security system have a unique and defined relationship established at some time in the past and enduring.

The unique identifier makes for giving the user some control over the data security system when the user has physical control of the data security system.

To increase the security of the communication with the data security system 620 where the mobile device 610 is a smartphone, a user may choose to enable a feature, such as a feature called IPhone here. This feature restricts significant user interactions with the data security system 620 to one and only one mobile device 610. This is done by replacing the data security system unique identifier described above with a random identifier shared securely between the data security system 620 and the mobile device 610. So, instead of presenting the data security system unique identifier when, for example, the user unlocks the data security system 620, the IPhone identifier must be given instead. In effect, this makes the user's mobile device 610 a second authentication factor, in addition to a PIN or password, for using the data security system 620. As an example, the paired user phone selected as "IPhone" can be used without a PIN, and as the user-authentication single factor and/or in a combination with any other user-authentication factors. If such feature (IPhone) is selected, the data security system 620 cannot be opened with any other phones, except if an administrator's unlock was enabled before.

It will be understood that other embodiments can be made to require an administrator's password on the data security system 620 in order to use the IPhone feature. Another embodiment may require that the server/console 640 is capable of recovering the data security system 620 in case the IPhone data is lost on the mobile device 610.

The user may enable a proximity auto-lock feature for the data security system 620. During a communication session, the data security transceiver 624 of FIG. 6B reports to the data security system 620 a signal strength measurement for the mobile device 610. The data security system application 618 on the mobile device 610 sends the data security system 620 both the originating signal power level and the threshold for proximity.

Because the signal strength varies due to environmental conditions around the transceivers, the data security system 620 mathematically smooths the signal strength measurements to reduce the likelihood of a false positive. When the data security system 620 detects that the signal power received has dropped below a defined threshold for a predetermined period of time, it will immediately lock the data security system 620 and prevent access to the storage subsystem 106 of FIG. 6B.

The data security system 620 could be used in three different modes: a User Mode where the functionalities of the data security system 620 are determined by the user; an Administrator Mode where an administrator can set an Administrator password and enforce some restrictions on the data security system 620 (e.g., automatic lock after a predetermined period of inactivity, Read-Only, IPhone) and where restrictions cannot be removed by a User; and a Server Mode where an administrator role is set where the server/console 640 can remotely reset the data security system 620, change user passwords, or just unlock the data security system 620.

Figure 8:
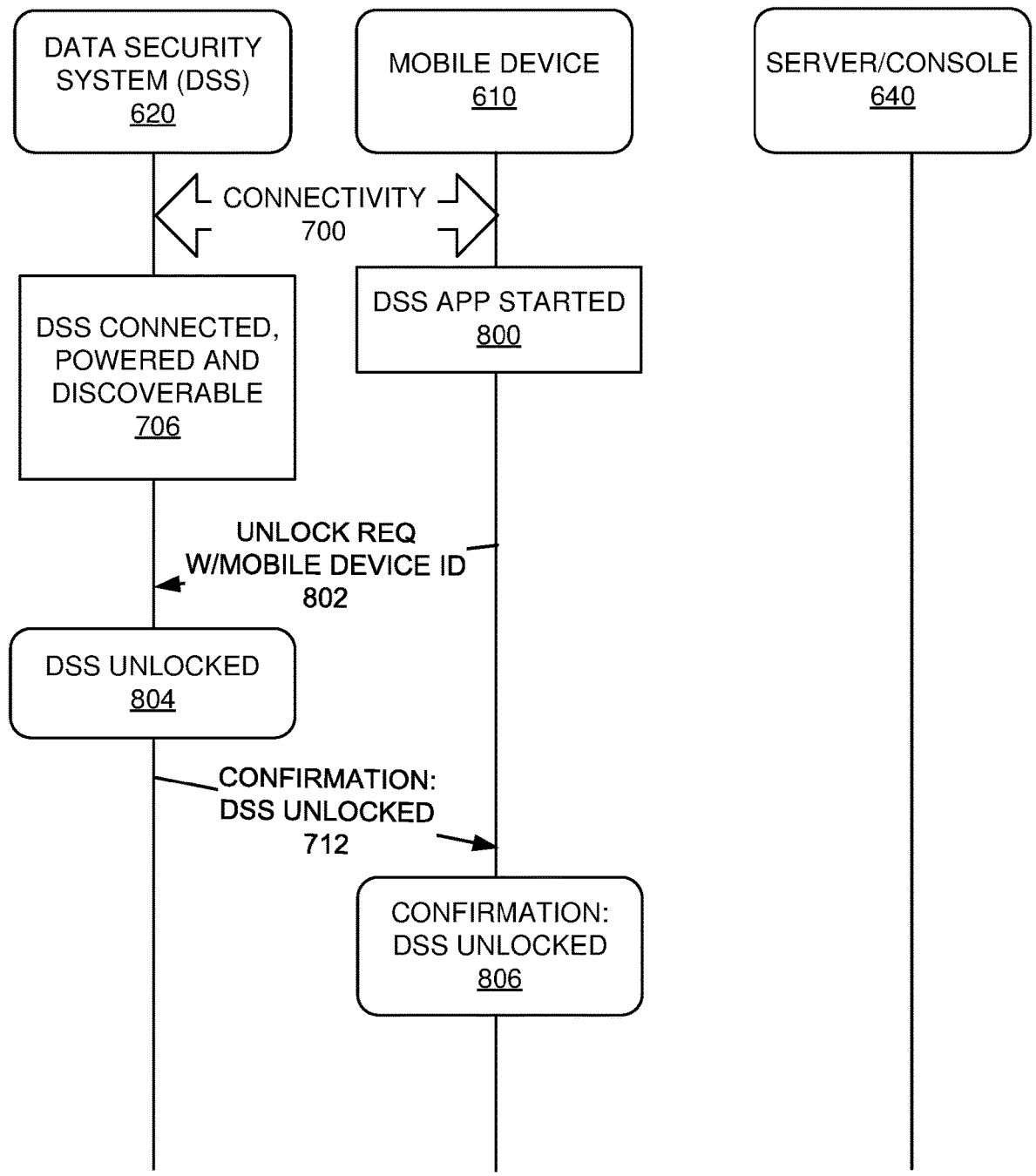
FIG. 8 is an unlocking-sequence diagram where the mobile device is an authentication factor.

Referring now to FIG. 8, therein is shown an unlocking sequence diagram where the mobile device 610 is used as an authentication factor. This diagram shows an auto-unlock process, of the data security system 620, initiated by the data security system application 618 from a specific mobile device, the mobile device 610. A user can use one mobile device that was initially paired with the data security system 620. If the paired mobile device 610 is lost, then the data security system 620 cannot be unlocked (unless administrator password was set before as shown in FIG. 7).

While similar to FIG. 7, a data security system application started operation 800 occurs after the connectivity 700 is established. An unlock required with mobile device ID signal 802 is sent from the mobile device 610 to the data security system 620 after a data security system connected, powered and discoverable operation 706. A data security system unlocked operation 804 occurs and a confirmation: data security system unlocked signal 712 is sent from the data security system 620. After a confirmation: data security system unlocked operation 806, the mobile device 610 and the data security system 620 are in full operative communication.

If a PIN (Personal Identification Number) was not set up, then the paired mobile device is used as one-factor authentication.

Figure 9:
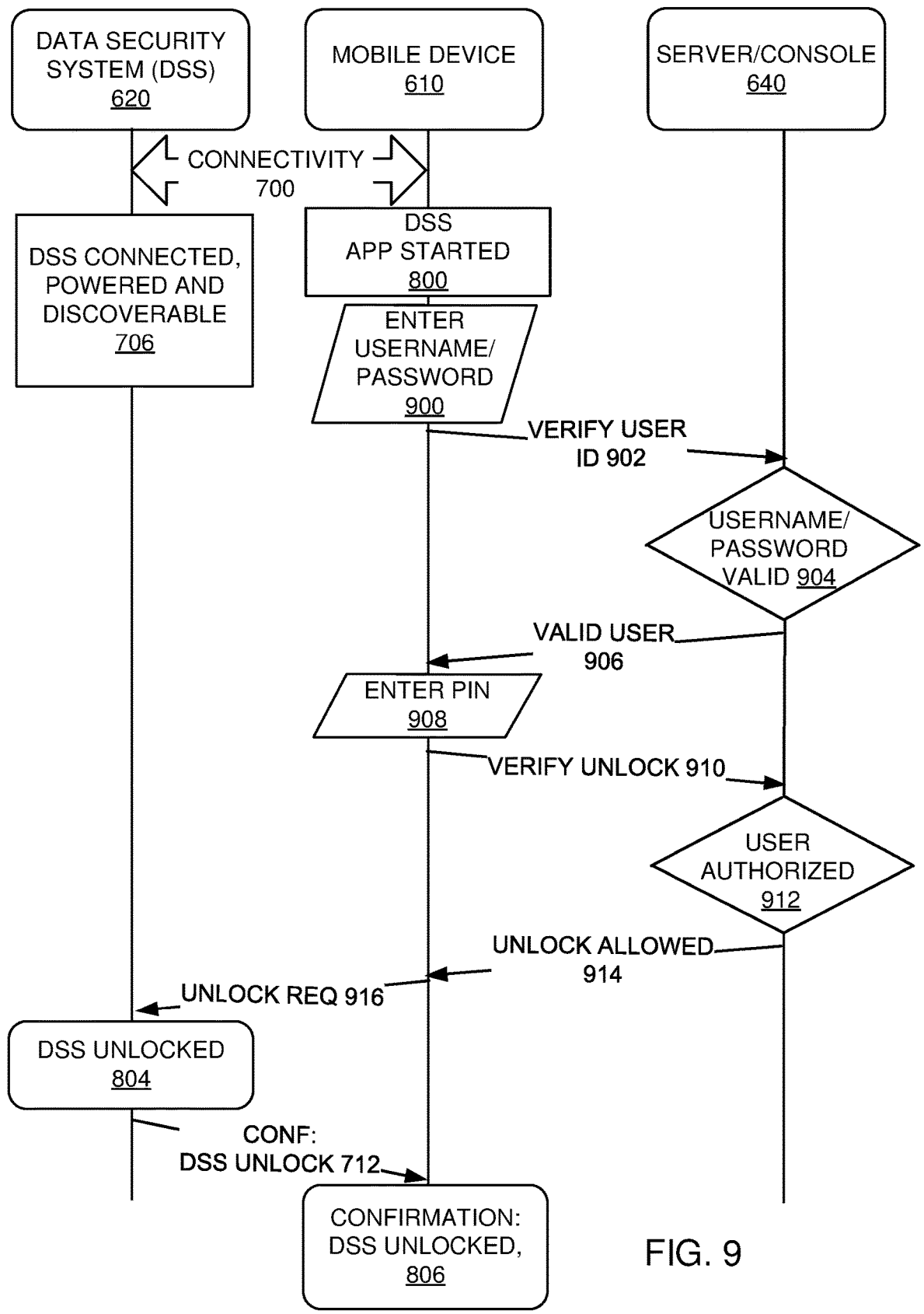
FIG. 9 is an unlocking-sequence diagram showing unlocking using a PIN entry from the mobile device.

Referring now to FIG. 9, therein is shown an unlock sequencing diagram showing unlocking using a PIN entry from the mobile device 610. This diagram shows the process of unlocking the data security system 620 by entering a PIN in the data security system application 618 in the mobile device 610. The data security system 620 cannot be unlocked without entering the correct PIN.

While similar to FIGS. 7 and 8, in FIG. 9 an enter username/password operation 900 occurs after the data security system application started operation 800. After the enter username/password operation 900, the mobile device 610 sends a verify user ID signal 902 to the server/console 640. The server/console 640 then makes a username/password valid determination 904.

When the username/password valid determination 904 verifies the user, a valid user signal 906 is sent to the mobile device 610 for the user to enter the correct PIN in an enter PIN operation 908 in the mobile device 610. The mobile device 610 then sends a verify unlock signal 910 to determine if the correct PIN has been entered to the server/console 640.

The server/console 640 makes a user authorized determination 912 and determines if the user is authorized to use the specific data security system, such as the data security system 620, that the PIN is authorized for. If authorized, an unlock allowed signal 914 is sent to the mobile device 610, which passes on an unlock request signal 916 to the data security system 620.

The data security system unlocked operation 804 is performed and the confirmation: data security system unlocked signal 712 is sent to the mobile device 610 where the confirmation, data security system unlocked operation 806 is performed.

Figure 10:
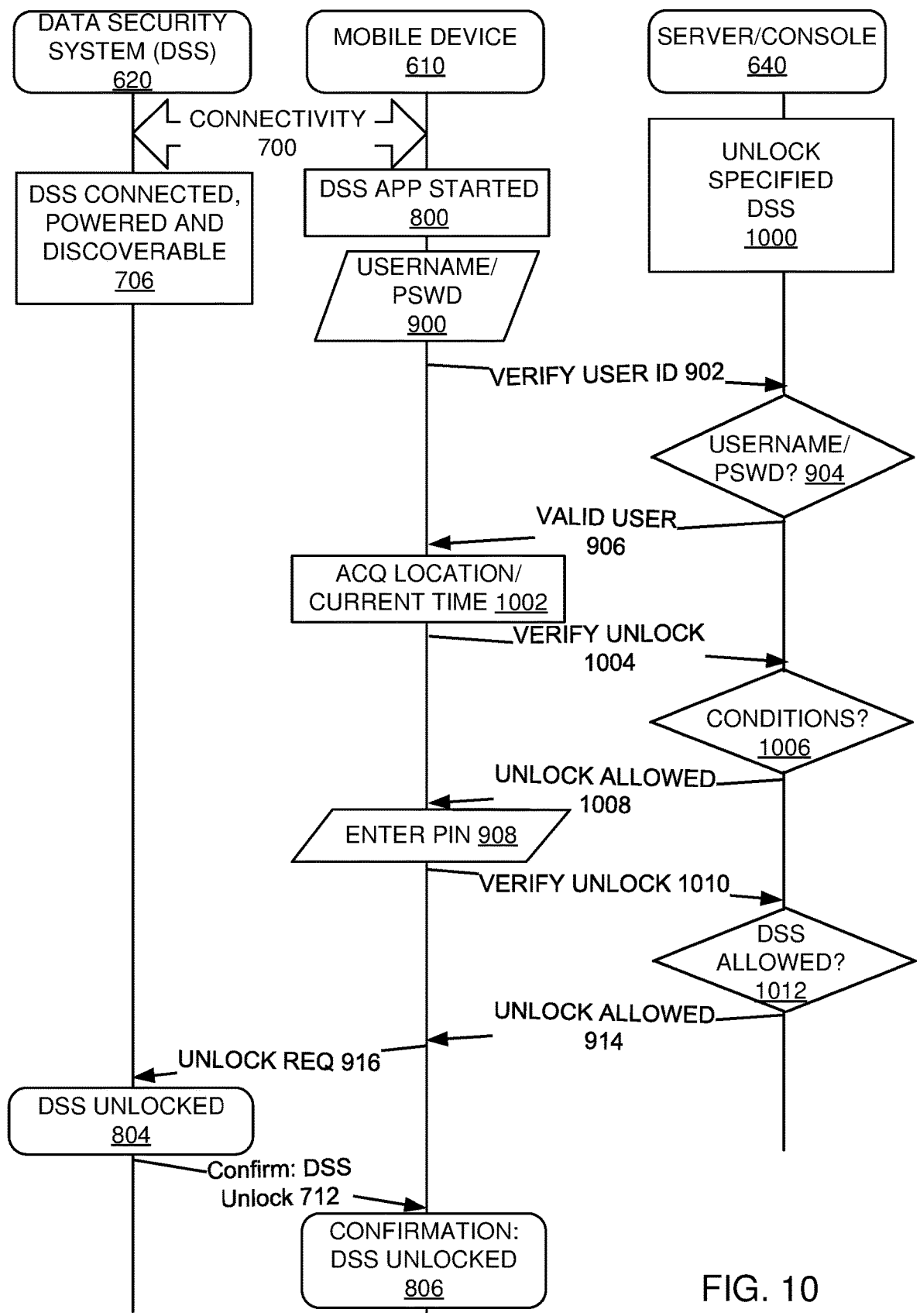
FIG. 10 is an unlocking-sequence diagram showing unlock using a PIN entry and user ID/location/time verification via the server/console.

Referring now to FIG. 10, therein is shown an unlock sequencing diagram showing unlock using a PIN entry and User ID/location/time verification via the server/console 640. This diagram shows the most secure process of unlocking the data security system 620 by entering a PIN in the data security system application 618 from the mobile device 610, authenticating in the server/console 640 server using a UserID (username/password), and by verifying geo-fencing permissions to unlock the data security system 620 at a specific location and at a certain time range. The data security system 620 cannot be unlocked without entering the PIN, username and password, and having the mobile device 610 be present in specific (predefined) location and certain (predefined) time.

While similar to FIGS. 7-9, in FIG. 10 at the server/console 640, an unlock specified data security system operation 1000 is performed to allow setting of the desired conditions under which the specified data security system, such as the data security system 620, will operate. For example, the conditions could be within a specific geographical area and/or specific time frame.

At the mobile device 610, a current condition determination is made, such as in an acquire location and/or current time operation 1002. This operation is performed to determine where the mobile device 610 is located and or what the current time is where the mobile device 610 is located. Other current conditions around the mobile device 610 may also be determined and sent by a verify unlock signal 1004 to the server/console 640 where a conditions-met determination 1006 is made.

When the desired conditions are met, an unlock allowed signal 1008 is sent to the mobile device 610 for the enter PIN operation 908 to be performed. After the PIN is entered, a verify unlock signal 1010 is sent with the PIN and an identification of the data security system 620 that is in operational proximity to the mobile device 610. The verify unlock signal 1010 is received by the server/console 640 and a data security system allowed determination 1012 is made to determine that the specified data security system is allowed to be unlocked by the authorized user. The server/console 640 verifies that this "specific" user is authorized to use the specified data security system.

After determining the correct information has been provided, the server/console 640 will provide an unlock allowed signal 914 to the mobile device 610, which will provide a unlock request signal 916. The unlock request signal 916 causes the data security system 620 to operate.

Figure 11:
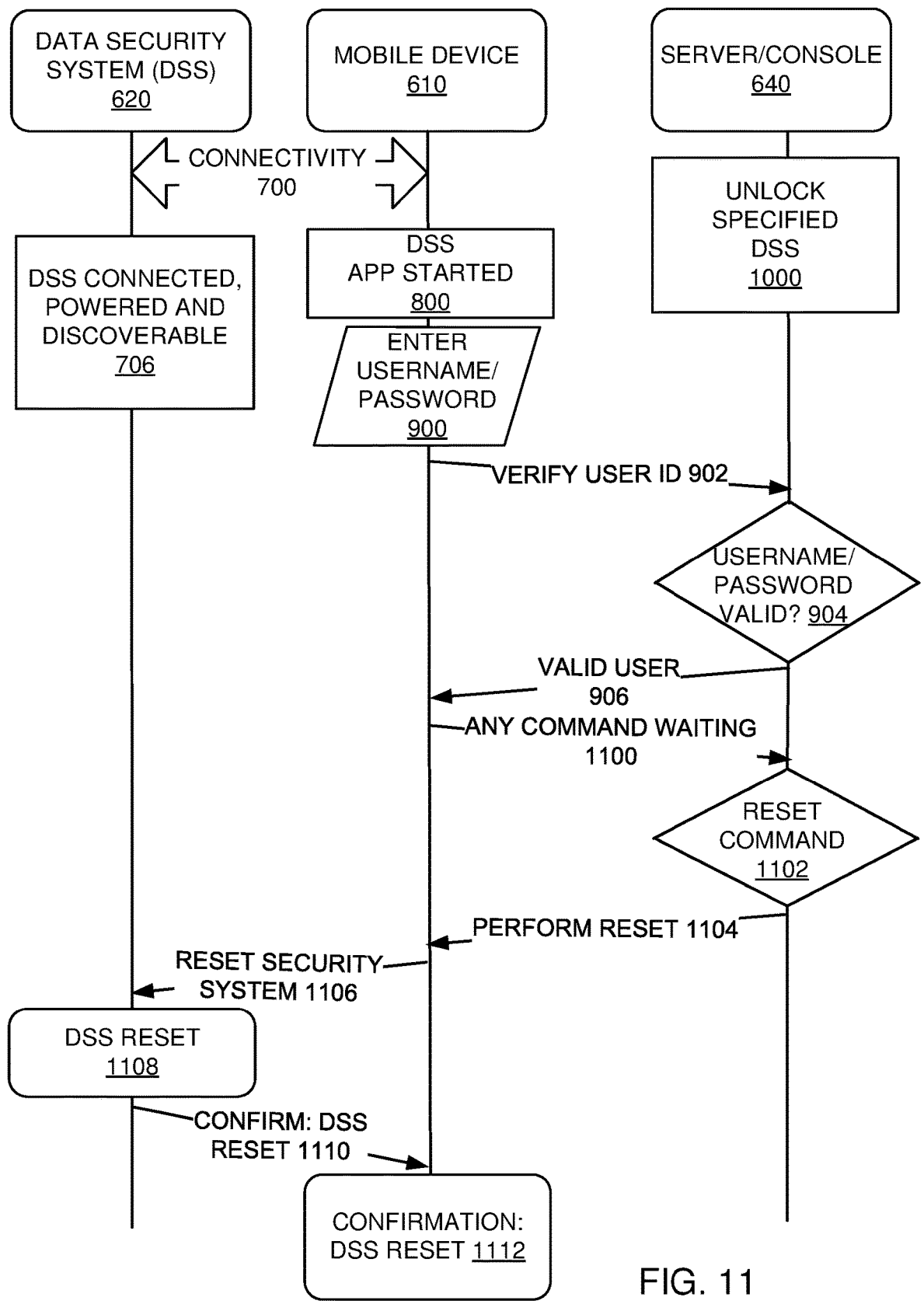
FIG. 11 is a reset sequencing diagram showing resetting the data security system using a server/console.

Referring now to FIG. 11, therein is shown a reset sequencing diagram showing resetting the data security system 620 using the server/console 640. This diagram shows the ability to reset the data security system 620 remotely via the server/console 640. The data security system 620 can receive commands only from the mobile device 610 over the wireless connection. However, by setting a "Reset" flag on the server/console 640 for a specific data security system (using its S/N), the data security system application 618 running on the mobile device 610 will query the server/console 640 for any flags/pending requests in the user management database 642. When the user connects the data security system 620, the data security system application 618 on the mobile device 610 will execute a waiting "reset" command. After a successful reset (e.g., all user data and credentials are erased and unrecoverable), the server/console 640 will remove the Reset flag so it will not be executed the next time the mobile device 610 is connected to the specific data security system.

While similar to FIGS. 7-10, in FIG. 11 the mobile device 610 responds to the valid user signal 906 by sending an any command waiting signal 1100 to the server/console 640 to make a reset command determination 1102. When the reset command is present, a perform reset signal 1104 will be sent to the mobile device 610.

The mobile device 610 will send a reset security system signal 1106 to the data security system 620 to start a data security system reset operation 1108. Upon completion of the data security system reset operation 1108, the data security system 620 will send a confirmation: data security system reset signal 1110 to the mobile device 610 to set a confirmation: data security system reset operation 1112 into operation. Thereafter, the mobile device 610 and the data security system 620 are in full operative communication with the data security system 620 reset.

Figure 12:
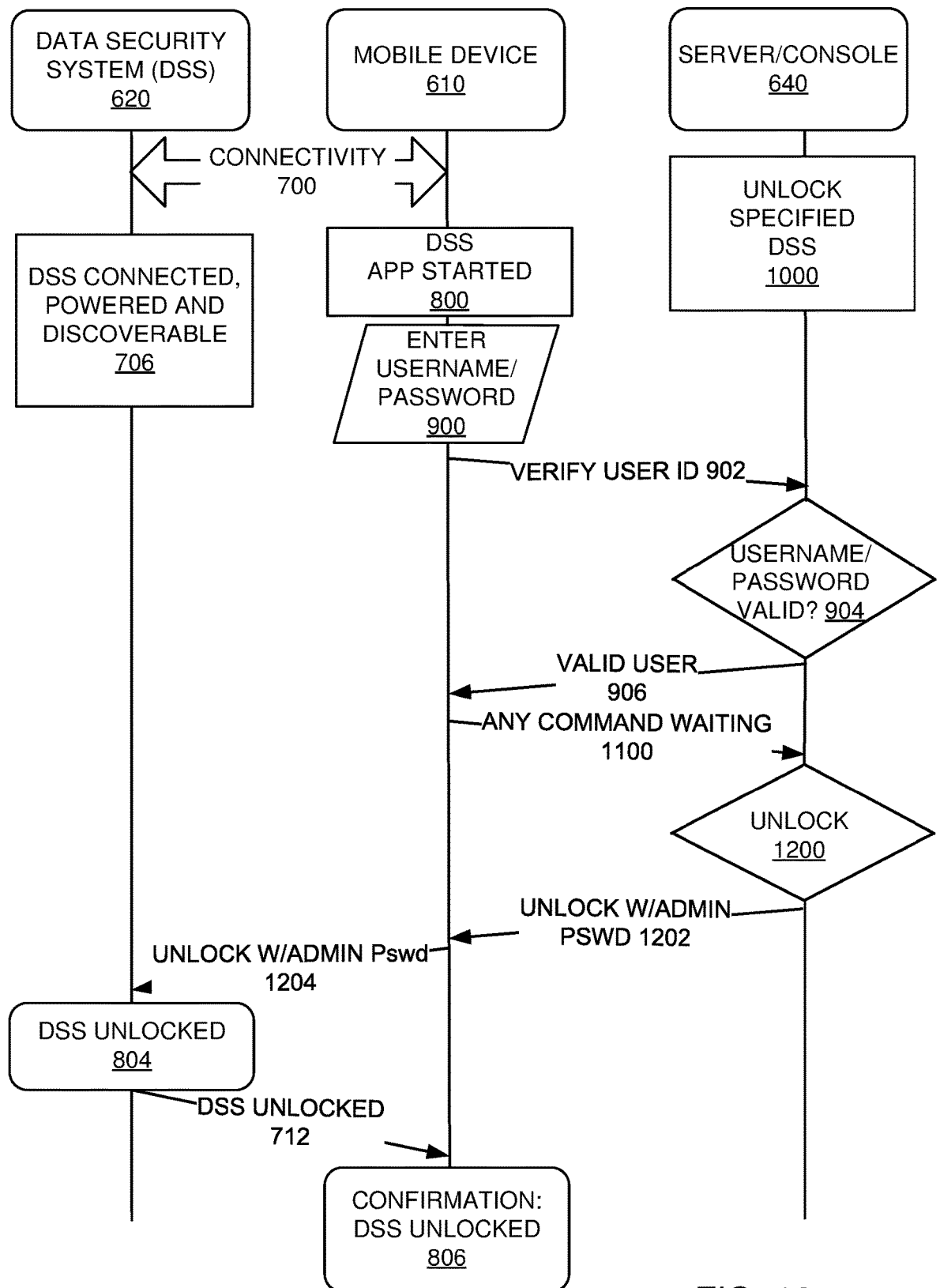
FIG. 12 is an unlocking-sequence diagram showing unlocking the data security system using the server/console.

Referring now to FIG. 12, therein is shown an unlock sequencing diagram showing unlocking the data security system 620 using the server/console 640. This diagram shows the ability to unlock the data security system 620 remotely via the server/console 640. The data security system 620 can receive commands only from the mobile device 610 over the wireless connection. However, by setting an "Administrator Unlock" flag on the server/console 640 for a specific data security system (e.g., using its S/N), the data security system application 618 running on the mobile device 610 will query the server/console 640 for any flags indicating pending requests. When the user connects the data security system 620, the data security system application 618 on the mobile device 610 will execute a waiting "Administrator Unlock" command. After successful Administrator unlock, the user's data is untouched, but the user's password is removed (the data security system 620 cannot be unlocked by the user). The server/console 640 will reset the Reset flag for the data security system 620 so it will be not executed next time when the mobile device 610 is connected to the data security system 620.

While similar to FIGS. 7-11, in FIG. 12, after receiving the any command waiting signal 1100, the server/console 640 performs an unlock 1200 when there is a command to unlock with an administrator's password. An unlock with an administrator's password signal 1202 is sent to the mobile device 610, which provides an unlock with administrator's password signal 1204 to the data security system 620 to start the data security system unlocked operation 804. Thereafter, the mobile device 610 and the data security system 620 are in full operative communication.

Figure 13:
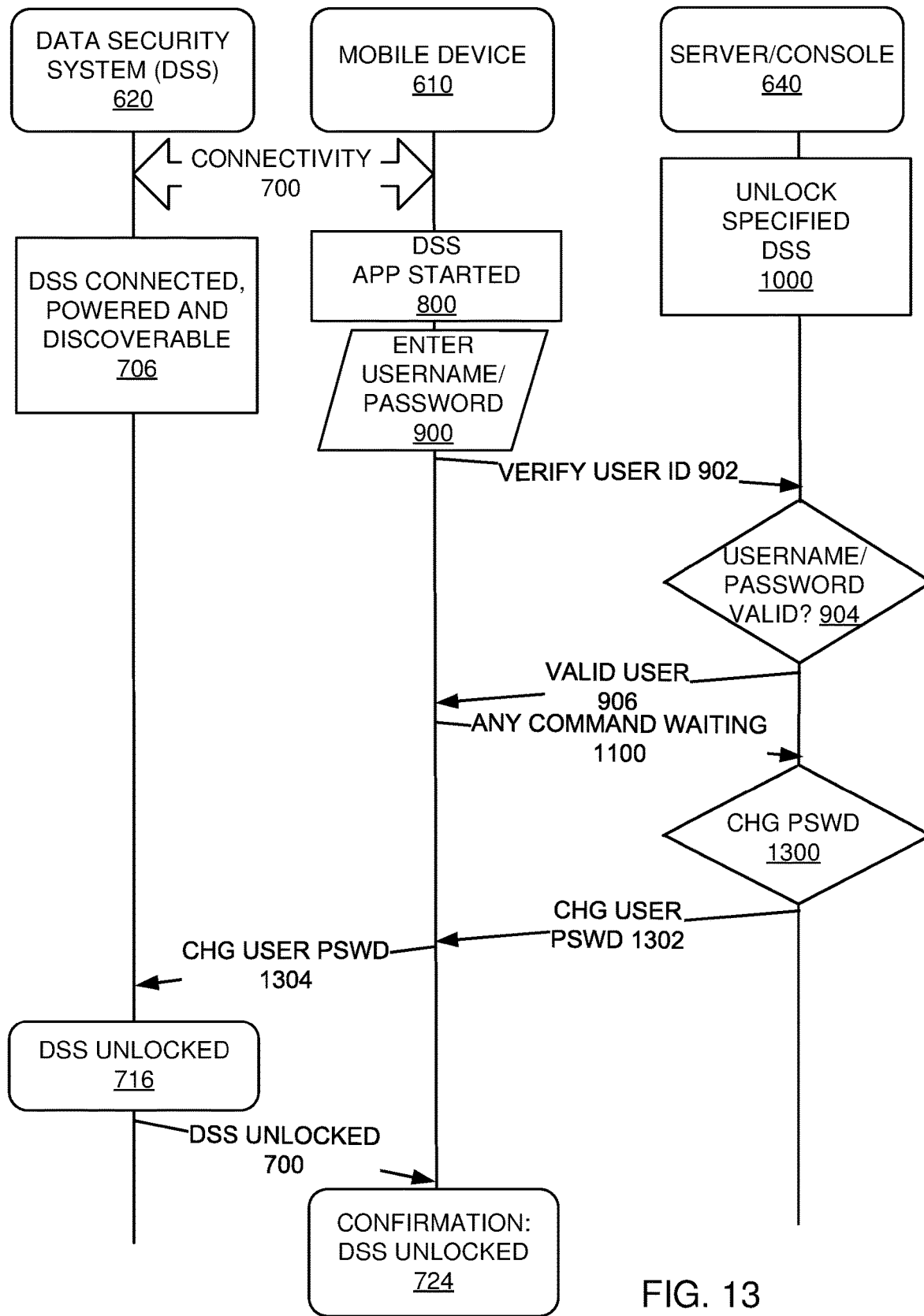
FIG. 13 is a change user's password sequence diagram using the server/console.

Referring now to FIG. 13, therein is shown a change-user password sequencing diagram using the server/console 640. This diagram shows the ability to change the user's password for data security system 620 remotely via the server/console 640. The data security system 620 can receive commands only from the mobile device 610 over the wireless connection. However, by setting a "Change User's Password" flag on the server/console 640 for a specific data security system (e.g., using its S/N), the data security system application 618 running on the mobile device 610 will query the server/console 640 for any flags indicating pending requests. When the user connects his data security system 620, the data security system application 618 on the mobile device 610 will execute the pending "Change User's Password" command. After the successful unlock and password change, the user's data is untouched and the data security system 620 can be unlocked with the new user's password. The server/console 640 will reset the "Change User's Password" flag for this data security system 620 so it will not be executed the next time the mobile device 610 is connected to the specific data security system.

While similar to FIGS. 7-12, in FIG. 13 the server/console 640 responds to the any command waiting signal 1100 by making a change password determination 1300. When there has been a password change at the server/console 640, a change user password signal 1302 is sent to the mobile device 610, which sends a change user password signal 1304 to the data security system 620. Thereafter, the mobile device 610 and the data security system 620 are in full operative communication with the new password.

In some example embodiments, a user may interact with the server/console 640 to recover a lost or forgotten password. The user sends a request to the server/console 640 to recover the password, which may be a general password for the user, or a particular password for a particular device.

The server/console 640 then authenticates the user (e.g., two factor authentication), and if the user is authenticated, the server/console retrieves the password from the server database and provides the password to the user.

In other example embodiments, the password may be reset instead of recovered and the user would enter the new password at the server/console 640.

A method of operation of a data security system comprising: providing a mobile device with a data security system application for connectivity with the data security system; starting the data security system application; and maintaining connectivity of the data security system with the mobile device.

The method as described above wherein maintaining the connectivity maintains the connectivity when the data security system is within a predetermined proximity to the mobile device.

The method as described above wherein maintaining the connectivity maintains the connectivity when the data security system is within a predetermined proximity to the mobile device for a predetermined period of time.

The method as described above wherein establishing the connectivity includes using bi-directional communication between the data security system and the mobile device.

The method as described above wherein establishing the connectivity includes using uni-directional communication between the data security system and the mobile device.

The method as described above further comprising communication between the mobile device with the data security system application and a server containing a user management database.

The method as described above further comprising providing security information in a security controller in the data security system.

The method as described above further comprising: providing a server with identification of a specified data security system; providing the data security system with a specific identification; and unlocking the data security system when the identification of the specified data security system is the same as the specific identification of the data security system.

The method as described above wherein providing a mobile device with the data security system application provides a data security system administrator's application and further includes: setting an administrator's password in the mobile device; transmitting the administrator's password from the mobile device to the data security system; and setting the administrator's password in the data security system and unlocking the data security system.

The method as described above further comprising: providing an unlock request along with a mobile device identification from the mobile device to the data security system; and receiving the unlock request in the data security system and unlocking the data security system.

The method as described above further comprising: entering a user name or password in the mobile device; determining when the user name or password is valid in a server after receiving the user name or password from the mobile device; communicating from the server to the mobile device when the user name or password is valid; and communicating from the mobile device to the data security system when the user name or password is valid to unlock the data security system.

The method as described above further comprising: entering a user name or password in the mobile device; determining when the user name or password is valid in a server after receiving the user name or password from the mobile device; communicating from the server to the mobile device when the user name or password is valid; determining when the identification number is valid in the server after receiving the identification number from the mobile device; and unlocking the data security system through the mobile device when the server determines the identification number is valid.

The method as described above further comprising: providing a valid location of the mobile device to a server; determining in the server when the mobile device is in the valid location; and unlocking the data security system through the mobile device when the server determines the mobile device is in the valid location.

The method as described above further comprising: providing a current time of operation for the data security system at the mobile device to a server; determining in the server when the mobile device is within the current time; and unlocking the data security system through the mobile device when the server determines the mobile device has the current time.

The method as described above further comprising: providing a command in a server; providing the command to the mobile device from the server in response to a command waiting signal from the mobile device; and performing the command in the data security system through the mobile device when the command is provided from the server.

The method as described above further comprising: providing a change password command in a server; providing the change password command to the mobile device from the server in response to a change password signal from the mobile device; and unlocking the data security system with the changed password in the data security system.

The method as described above further comprising connecting the data security system to a host computer for power and to be discoverable by the host computer.

A data security system comprising: a data security transceiver or receiver; an authentication subsystem operatively connected to the data security transceiver or receiver; and a storage subsystem connected to the authentication subsystem.

The system as described above further comprising a security controller connected to the data security transceiver or the receiver and to the authentication subsystem.

The system as described above further comprising a mobile device having a data security system application operating with the security controller for maintaining connectivity when the data security system is within a predetermined proximity to the mobile device.

The system as described above further comprising a mobile device having a data security system application operating with the security controller for maintaining connectivity when the data security system is within a predetermined proximity to the mobile device for a predetermined period of time.

The system as described above further comprising a mobile device having a mobile transceiver or receiver for maintaining connectivity using bi-directional communication between the data security system and the mobile device.

The system as described above further comprising a mobile device having a mobile transceiver or receiver for maintaining connectivity using uni-directional communication between the data security system and the mobile device.

The system as described above further comprising a wired or wireless connection communication between a mobile device with a data security system application and a server containing a user management database.

The system as described above wherein the data security system includes an external communication channel for connection to a host computer.

Figure 14:
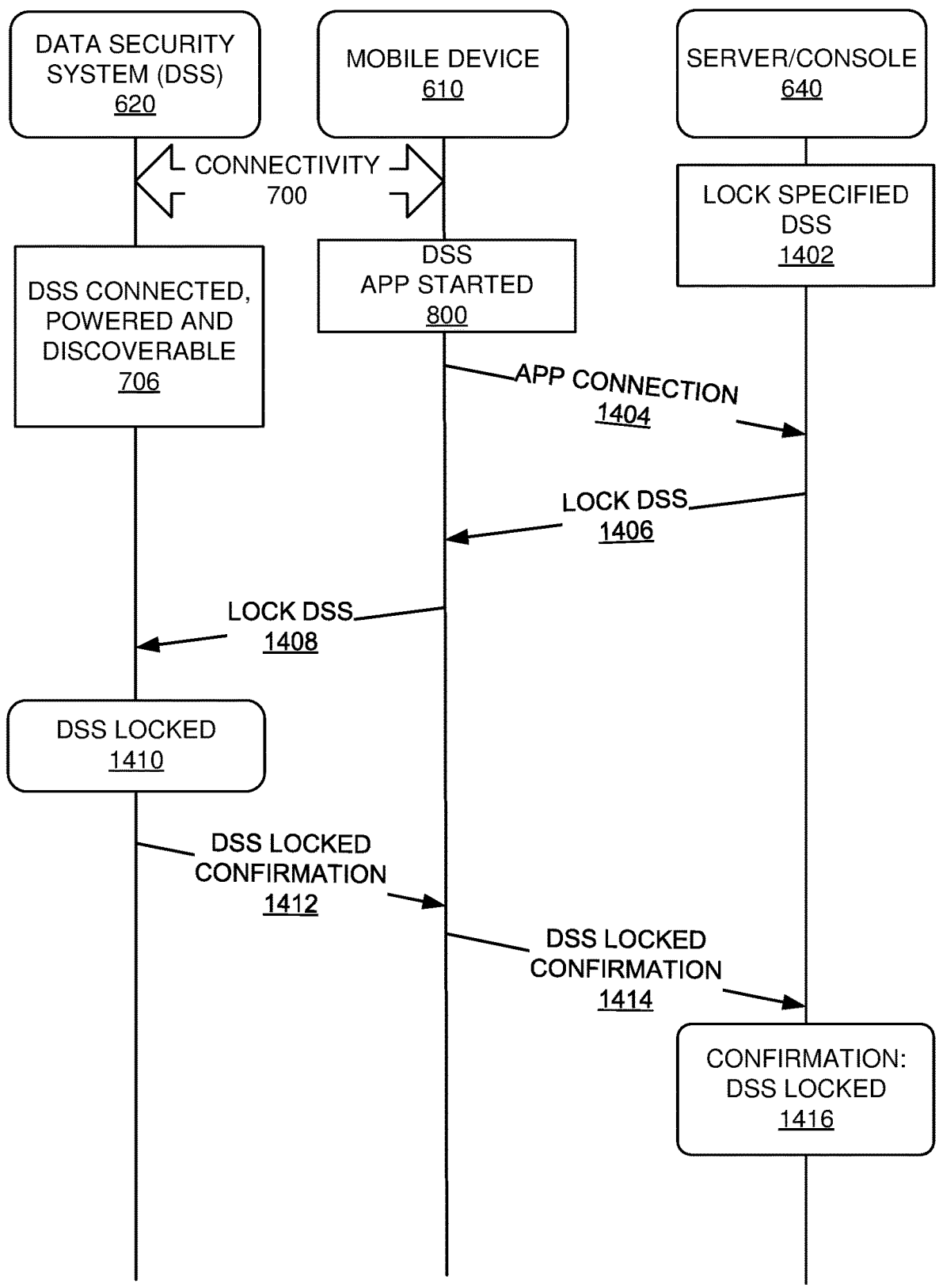
FIG. 14 is a diagram illustrating the remote locking of a device from the management console.

FIG. 14 is a diagram illustrating the remote locking of a device from the management console. An administrator may enter a command to unlock at the server/console 640, and when the mobile device 610, associated with data security system 620, establishes a connection with the server console 640, the data security system will be locked and the user will not be able to unlock it until a new command is generated to unlock the device.

At operation 1402, the lock is specified at the server/console 640 for the specific data security system 620. When the mobile device 610 sends a connection request 1404 from the application executing on the mobile device, the server/console responds 1406 with a command to lock the data security system 620.

The mobile device 610 forwards 1408 the lock DSS command. The data security system 620 then performs the law of operation 1410, which disables user unlocking of the data security system 620 until a new unlock command is received. For example, the new unlock command may be sent by an administrator of the account associated with the data security system 620.

After the data security system 620 is locked, the data security system 620 sends a locked confirmation 1412 to the mobile device 610. The mobile device 610 then forwards 1414 the locked confirmation to the server/console 640. The server/console 640 then confirms 1416 that the DSS has been locked, so the DSS 620 will show as locked and the lock request is completed.

Figure 15:
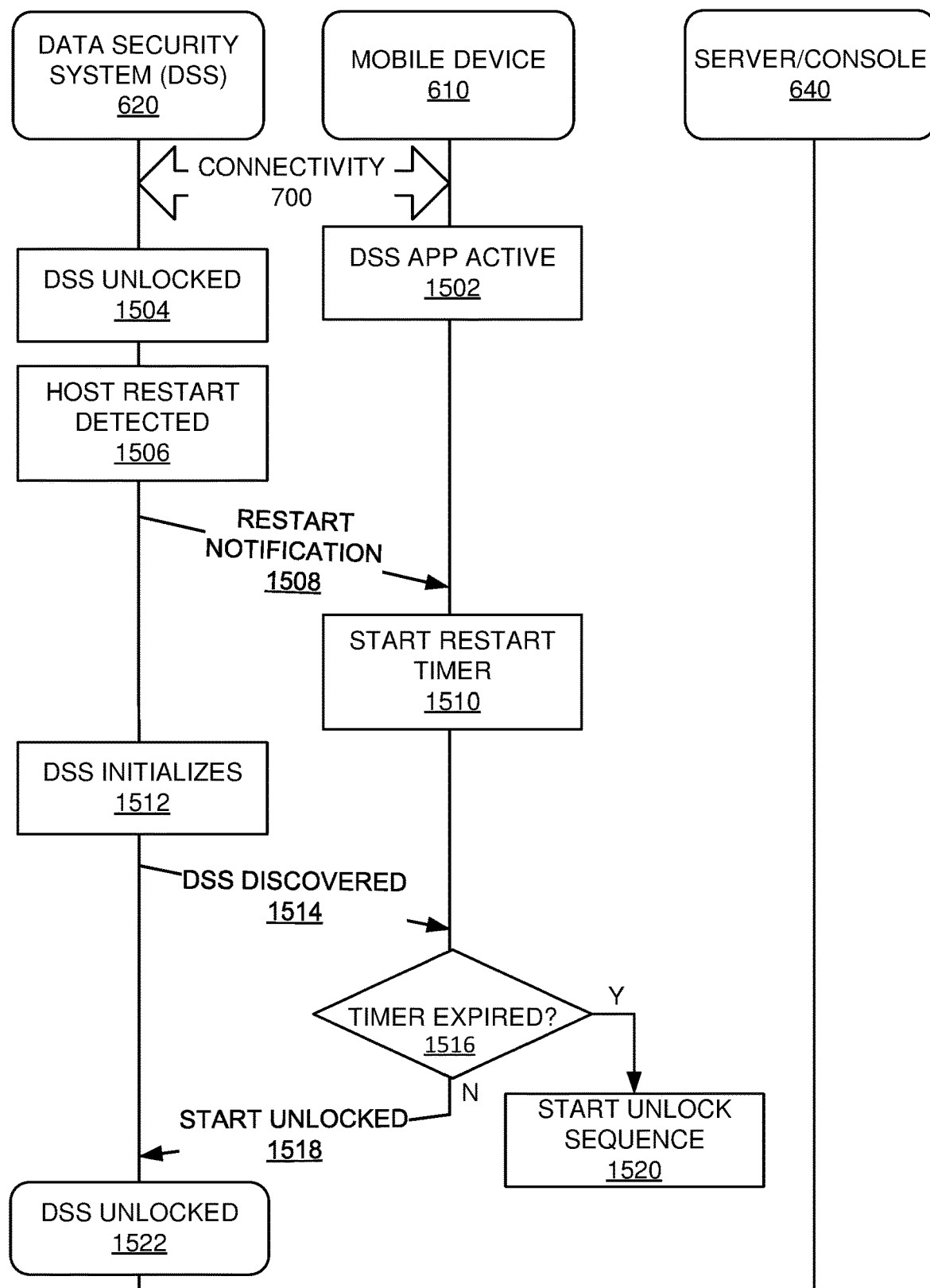
FIG. 15 is a diagram illustrating keeping the data security system unlocked during a reboot process.

FIG. 15 is a diagram illustrating keeping the data security system 620 unlocked during a reset process. If a host performs a reboot, the host shuts down and then restarts again. If the host has a secure SED and the SED is using the power source in the host, when the host shuts down, the SED will lose power and the SED will be locked. Even if the SED uses its own power supply, the SED may detect that the host has shut down and the SED will lock.

When the host restarts, the SED will not be available until the user unlocks the SED. However, in some cases, it is convenient to keep the SED unlocked during a reboot, or some other short-term power cycle, so the user does not have to go through the unlock process again. From the point of view of the user, the user already unlocked the SED, so there shouldn't be a need to unlock it again, just because the host reboots.

In some example embodiments, a restart timer is used to keep the data security system 620 unlocked during a reboot. The restart timer may be implemented on the mobile device 610, as illustrated in FIG. 15, or may be implemented by the data security system 620 itself (not shown).

At operation 1502, the application executing on the mobile device 610 is activated, and at operation 1504, the DSS 620 is unlocked as previously described.

At operation 1506, the data security system 620 detects a host restart operation, and a restart notification is sent 1508 to the mobile device 610. The mobile device 610 then starts a restart timer 1510, such that when the data security system 620 restarts within a threshold amount of time, the data security system 620 will automatically be initialized in the unlocked state without requiring user authentication.

In operation 1512, the data security system 620 initializes. The data security system is discovered at operation 1514 by the mobile device 610. After the discovery, the mobile device 610 performs a check 1516 to determine if the restart timer has expired.

If the restart timer has not expired, the mobile device 610 sends a start-unlocked command 1518 to the data security system 620. If the restart timer has expired, the mobile device 610 starts a new unlock sequence 1520 that requires user authentication. At operation 1522, the data security system 620 initializes in the unlocked state in response to the start unlocked command 1518 received from the mobile device 610.

If the data security system 620 implements the restart timer, the data security system 620 will check the timer upon initialization. If the timer has not expired, the data security system 620 will initialize in the unlock state; otherwise, the data security system 620 will wait for the unlock sequence.

Figure 16:
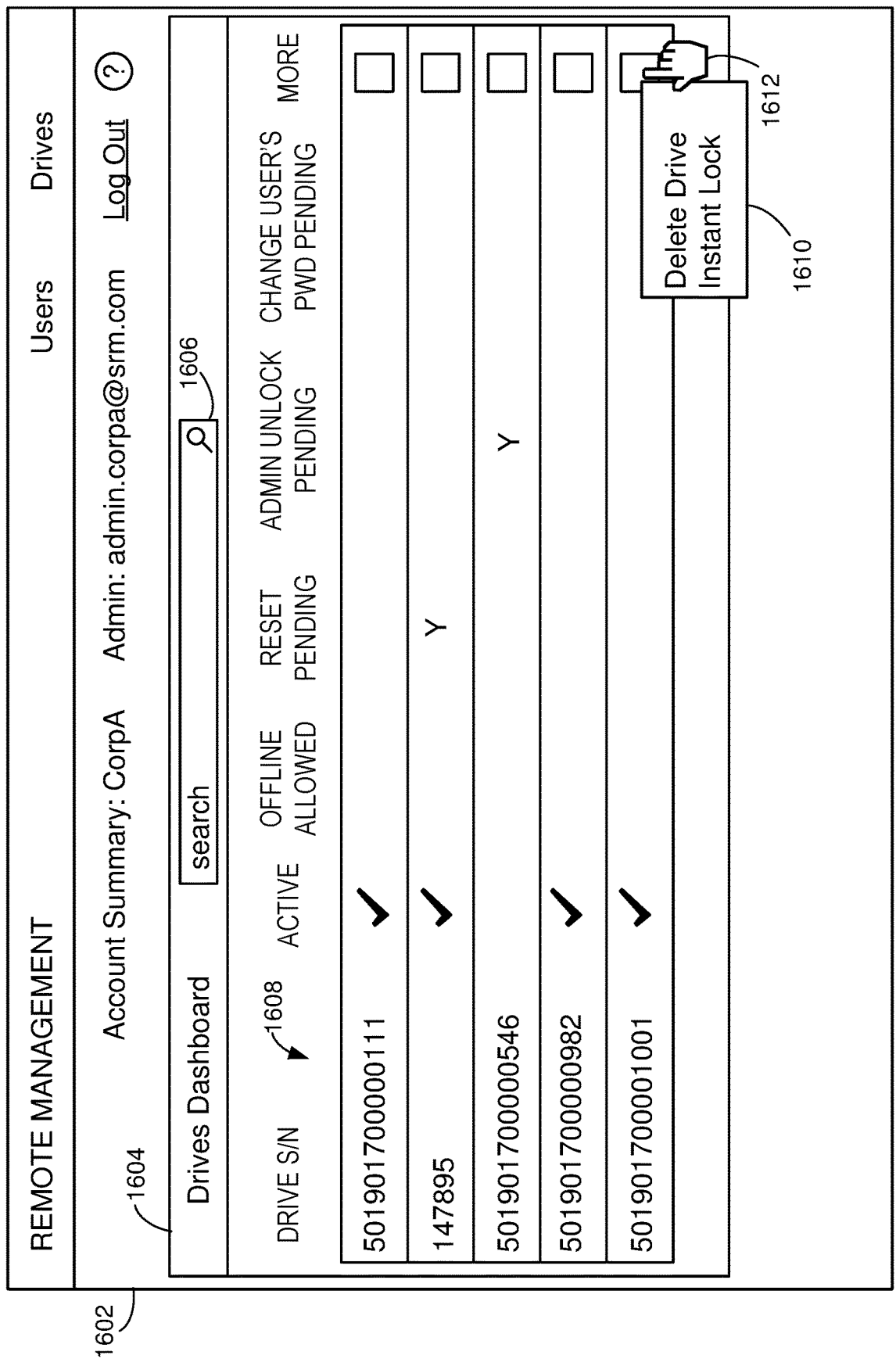
FIG. 16 is a user interface for configuring drive operations, according to some example embodiments.

FIG. 16 is a user interface 1602 for configuring drive operations, according to some example embodiments. The remote management user interface provides different options for managing users, administrators, counts, drives, licenses, etc., as described below with reference to FIGS. 16-21.

FIG. 16 shows the user interface 1602 for managing drives ("managed drives"). The user interface 1602 includes a message indicating that this screen corresponds to an account summary for a company (e.g., CorpA), for a given administrator of the company (e.g., admin.corpa@srm.com).

The drive information is presented in tabular form in a drives dashboard 1604, which includes drives table 1608 and a search option 1606 for searching drives. The drives table 1608 includes information for a list of drives, identified in the first column by their serial number. For each drive, the drives table 1608 indicates if the drive is active or not, a flag indicating if offline use is allowed, a flag indicating if a reset is pending for the drive, a flag indicating if an administrator unlock command is pending, a flag indicating if a change of user password is pending, and a more button 1612 that provides additional options. In some example embodiments, the more button 1612 provides options for deleting a drive from the system and for instantly locking the drive (as soon as communication with the drive is established).

The options for managing drives allow flexibility in the control of SEDs. For example, if an administrator suspects that a drive is being attacked by a malicious agent, the administrator can set a command to delete the drive or instantly lock the drive 1610. Once communication is established with the drive (e.g., via the mobile device), a delete drive operation will destroy the encryption key in the drive, and since the data is stored encrypted, it will not be possible to access the data stored in the drive.

If the instant lock is set, the drive will automatically lock. For example, if a laptop is stolen, the instant lock will automatically lock the drive, without having to wait for a timeout or detecting that the mobile device is beyond the safe area of operation.

Additionally, the administrator may request a remote unlock of the drive, and when the indication is established with the drive, the drive will automatically unlock and enable the data channel.

If the administrator selects one of the drives, a new screen (not shown) will provide additional options for managing the drive, such as enabling or disabling the drive, resetting the drive, changing the user password, and ordering an administrator unlock, indicating the user associated with the drive.

FIG. 17 is a user interface 1702 for managing users of remote devices, according to some example embodiments. The user interface 1702 includes a users dashboard 1704 and a window 1706 for adding users.

The users dashboard 1704 presents the users of the system in a users table 1708. For each user, the users table 1708 provides the name of the user, the login, a flag indicating if the user is enabled or disabled, and a button that provides additional commands, such as delete user, rename user, change password, etc.

The window 1706 provides fields for entering the name of the new user, the email address of the new user, an option for importing data for the user, and a create-user button 1710.

Figure 18:
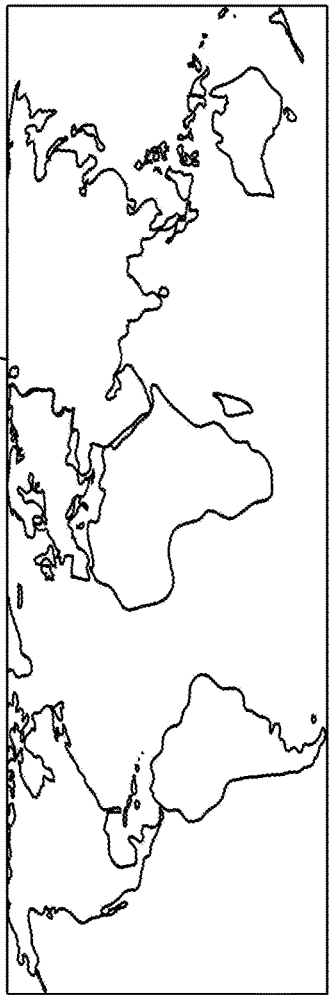
FIG. 18 is a user interface for setting time and geographic constraints on the use of devices.

FIG. 18 is a user interface 1802 for setting time and geographic constraints on the use of devices. The user interface 1802 allows configuring options for a user (e.g., alex@corpa.com). A window 1804 lists the drives enabled for this user and provides a field for adding additional drives.

Further, the windows 1808 and 1806 provide options for setting limits to the drives. The window 1808 includes two fields for entering a begin time and an end time in the day when the use is allowed. Another field allows the user to select the time zone for the time boundaries. If no time limits are set, the user may use the drive anytime during the day.

The window 1806 enables setting geographic limitations for the use of the allowed drives. The limitations may include setting an address (including street address, city, and country) or geographic coordinates, that together with a radius defines the region where the drive or drives may be used. The geographic limitations may also be configured for use in a given continent. A map 1810 highlights the areas where use is enabled or disabled based on the geographic parameters configured.

FIG. 19 is a user interface 1902 that provides a summary of the configured features for a client, according to some example embodiments. Window 1904 includes different options for managing an account, and the option "Summary" 1908 indicates that this is the summary view. The window 1904 further includes a table 1906 that provides summary data for the account.

In some example embodiments, the summary data includes the following fields: Licensed to, which indicates the name of the company that owns the license; License Type, which indicates the type of license; License Created By, which indicates the creator of the license; the License Key; Number of Administrators, which indicates the current number of administrators and the total number of possible administrators; Number of Users, which indicates the current number of users and the maximum number of users; and Number of Drives, which indicates the current number of drives in use and the maximum number of drives allowed by the license.

FIG. 20 is a user interface 2002 for configuring administrator contacts for a client, according to some example embodiments. In user interface 2002, the Admin Contacts option 2008 is highlighted within window 2004, and the administrators table 2006 shows a summary of the configured administrators, including their name or login, mobile phone information, and the last time the administrator logged into the system. In other example embodiments, other fields may be included, such as the fields of administrator user table 684 of FIG. 6D.

A similar interface (not shown) is presented when the user selects the User Contacts option, and the information about the users is presented. Additional details may be provided, including any of the fields of user table 682 of FIG. 6D.

FIG. 21 is a user interface 2102 for accessing drive-activity information, according to some example embodiments. The drives table 2106, inside window 2104, provides information about the drives configured for the client when the Drives Activity option 2108 is selected.

Each entry in the drives table 2106 includes the drive identifier (e.g., serial number), the date when the drive was provisioned (e.g., configured into the system), the administrator that provisioned the drive, the last time the drive was used, the user that used the drive last, and a geographical icon that would present the location where the drive was used for the last time. In other example embodiments, additional drive information may be provided, such as the drive data from drive table 680 of FIG. 6D.

Figure 22:
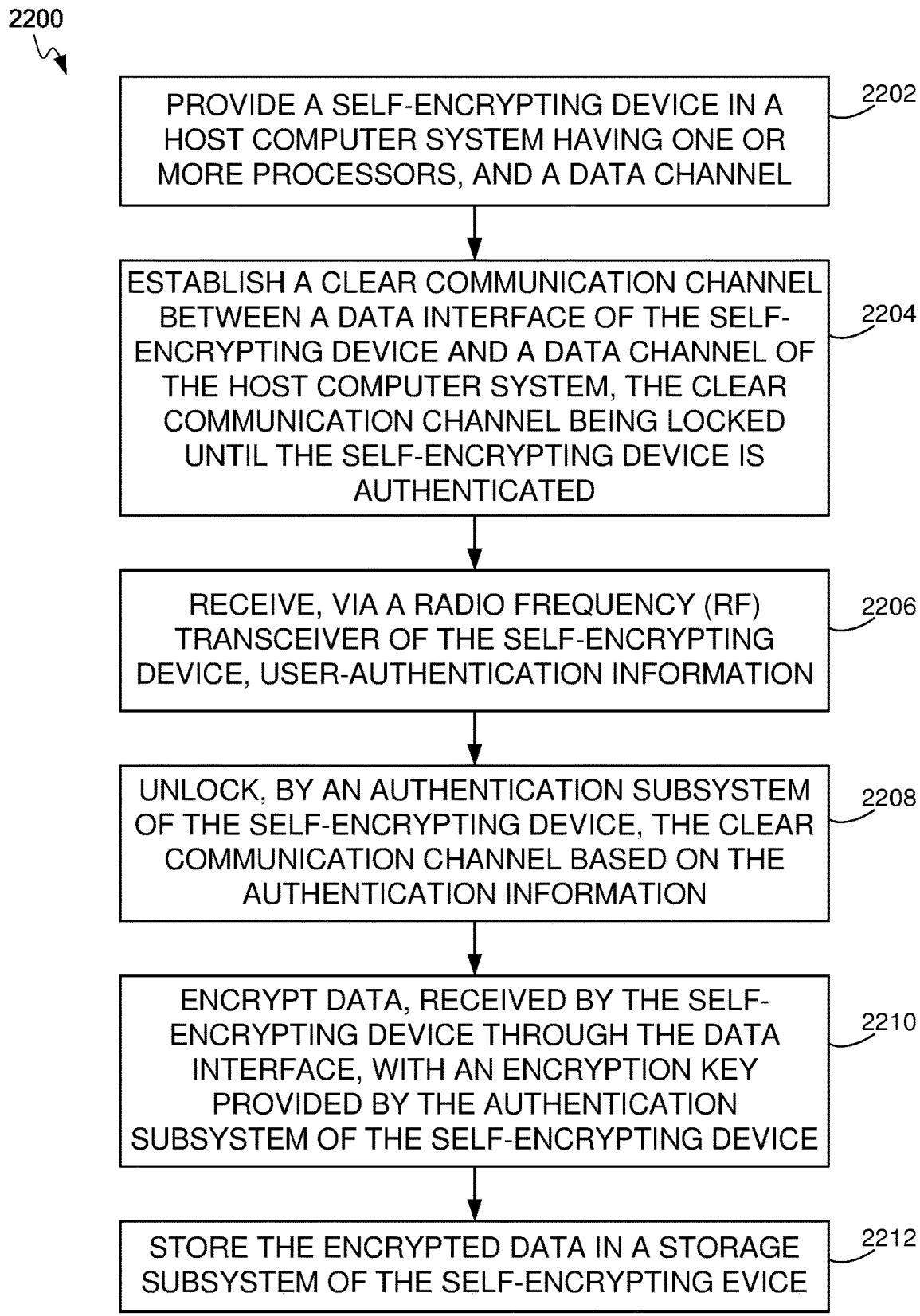
FIG. 22 is a flowchart of a method for providing host-independent authentication for a self-encrypting device incorporated into a host system, according to some example embodiments.

FIG. 22 is a flowchart of a method 2200 for providing host-independent user-authentication for a self-encrypting device incorporated into a host system, according to some example embodiments. While the various operations in this flowchart are presented and described sequentially, one of ordinary skill will appreciate that some or all of the operations may be executed in a different order, be combined or omitted, or be executed in parallel.

At operation 2202, a self-encrypting device is provided in a host computer system having one or more processors, and a data channel.

From operation 2202, the method 2200 flows to operation 2204 for establishing a clear communication channel between a data interface of the self-encrypting device and a data channel of the host computer system. The clear communication channel is locked until the self-encrypting device is authenticated.

From operation 2204, the method 2200 flows to operation 2206 for receiving, via a radio frequency (RF) transceiver of the self-encrypting device, user-authentication information.

From operation 2206, the method 2200 flows to operation 2208 where an authentication subsystem of the self-encrypting device unlocks the clear communication channel based on the user-authentication information.

From operation 2208, the method 2200 flows to operation 2210 for encrypting data, received by the self-encrypting device through the data interface, with an encryption key provided by the user-authentication subsystem of the self-encrypting device.

From operation 2210, the method 2200 flows to operation 2212, where the encrypted data is stored in a storage subsystem of the self-encrypting device.

In one example, the self-encrypting device authenticates a user without use of the one or more processors of the host computer system.

In one example, the RF transceiver is configured for communication with a mobile device, wherein the mobile device sends the user-authentication information to unlock the self-encrypting device.

In one example, an application in the mobile device provides a user interface for obtaining the user-authentication information from a user.

In one example, an application in the mobile device authenticates a user by validating the user with a management server, wherein the self-encrypting device receives an unlock command from the mobile device in response to the management server validating the user.

In one example, the host computer system further includes an encryption engine, wherein the authentication subsystem stores an encryption key and the authentication subsystem transmits the encryption key to the encryption engine when the self-encrypting device is unlocked.

In one example, the self-encrypting device initializes a timer when a shutdown of the system is detected, wherein the self-encrypting device initializes in a locked state and the self-encrypting device is automatically unlocked if the self-encrypting device is initialized before an expiration of the timer.

In one example, data is transmitted in clear form between the data interface and the data channel.

In one example, the authentication subsystem stores an authentication key for authenticating a user for unlocking the self-encrypting device.

In one example, the host computer system is one of a laptop, a personal computer, a kitchen appliance, a printer, a scanner, a server, a tablet device, or a smart television set.

Figure 23:
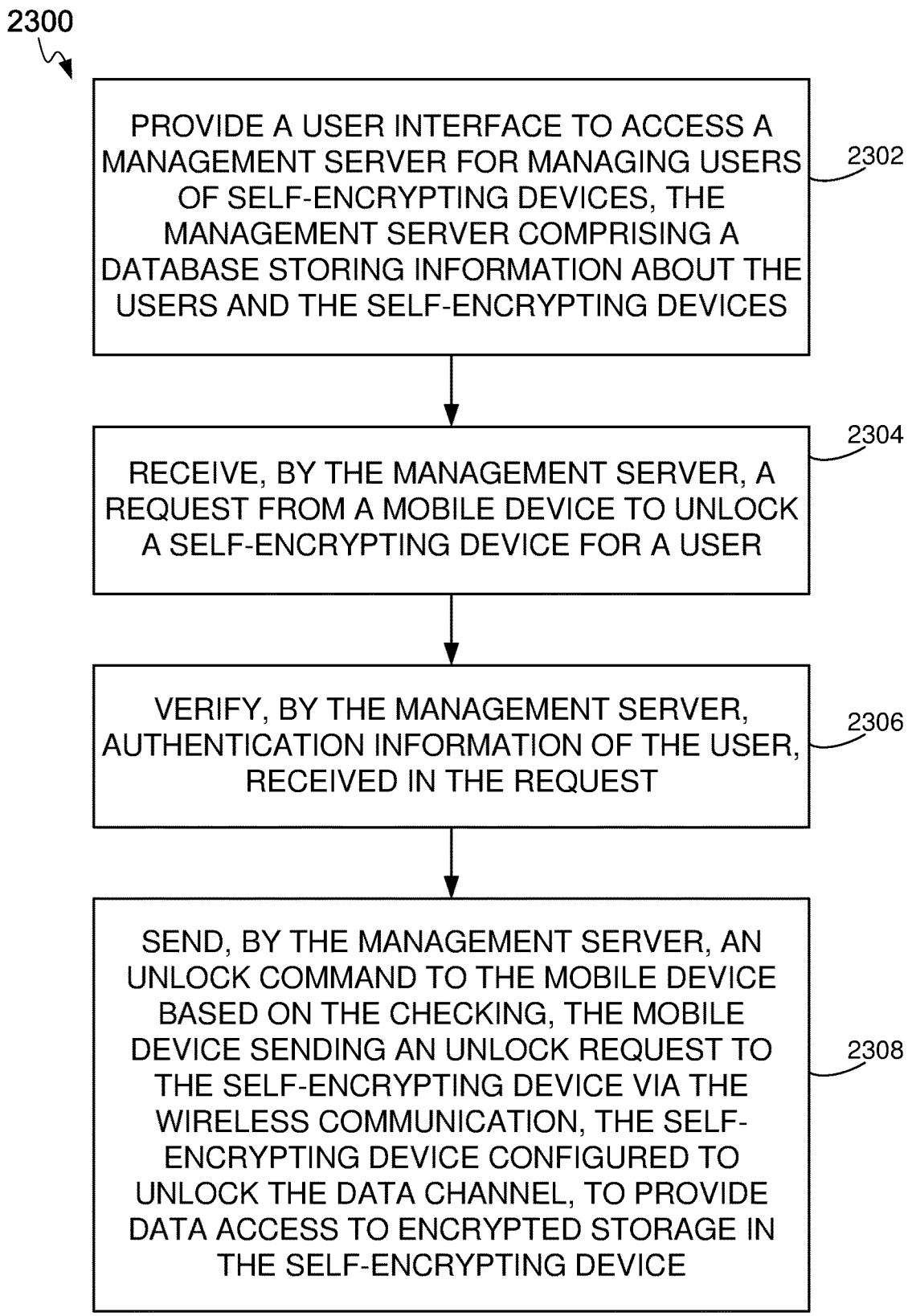
FIG. 23 is a flowchart of a method for remote management of self-encrypting devices with host-independent autonomous wireless authentication, according to some example embodiments.

FIG. 23 is a flowchart of a method 2300 for remote management of self-encrypting devices with host-independent autonomous wireless authentication, according to some example embodiments. While the various operations in this flowchart are presented and described sequentially, one of ordinary skill will appreciate that some or all of the operations may be executed in a different order, be combined or omitted, or be executed in parallel.

Operation 2302 is for providing a user interface to access a management server for managing users of self-encrypting devices. The management server comprises a database storing information about the users and the self-encrypting devices.

From operation 2302, the method 2300 flows to operation 2304 for receiving, by the management server, a request from a mobile device to unlock a self-encrypting device for a user, the self-encrypting device being in wireless communication with the mobile device.

From operation 2304, the method 2300 flows to operation 2306 where the management server verifies user-authentication information of the user, received in the request, for unlocking access to the self-encrypting device.

From operation 2306, the method 2300 flows to operation 2308 where the management server sends an unlock command to the mobile device based on the checking, the mobile device sending an unlock request to the self-encrypting device via the wireless communication. The self-encrypting device is configured to unlock the data channel, to provide data access to encrypted storage in the self-encrypting device.

In one example, the method 2300 further comprises receiving, via the user interface, a second request to lock the self-encrypting device; detecting, by the management server, a connection with the mobile device in wireless communication with the self-encrypting device; and sending a lock command to the mobile device to lock the self-encrypting device.

In one example, the method 2300 further comprises receiving, via the user interface, a third request to reset the self-encrypting device; detecting, by the management server, a connection with the mobile device in wireless communication with the self-encrypting device; and sending a reset command to the mobile device, the self-encrypting device configured to delete an encryption key in the self-encrypting device in response to the reset command.

In one example, the method 2300 further comprises providing, in the user interface, options to configure the self-encrypting devices, the options being to reset, enable, disable, lock, or unlock each self-encrypting device.

In one example, each drive has a unique hardware identifier stored in the database.

In one example, the method 2300 further comprises providing, in the user interface, options to allow access to one or more self-encrypting devices by a given user.

In one example, the method 2300 further comprises providing, in the user interface, options to establish geographic boundaries for use of the self-encrypting devices by the user.

In one example, the method 2300 further comprises providing, in the user interface, options to establish time-of-day boundaries for use of the self-encrypting devices by the user.

In one example, the method 2300 further comprises providing in the user interface, options to manage licenses for an account in the management server, the options including determining a maximum number of administrators, a maximum number of self-encrypting devices, and a maximum number of users.

In one example, the method 2300 further comprises providing, in the user interface, options to view self-encrypting device activity including data of provisioning, user that provisioned, time of last access, user in last access, and geographic location of last access.

Figure 24:
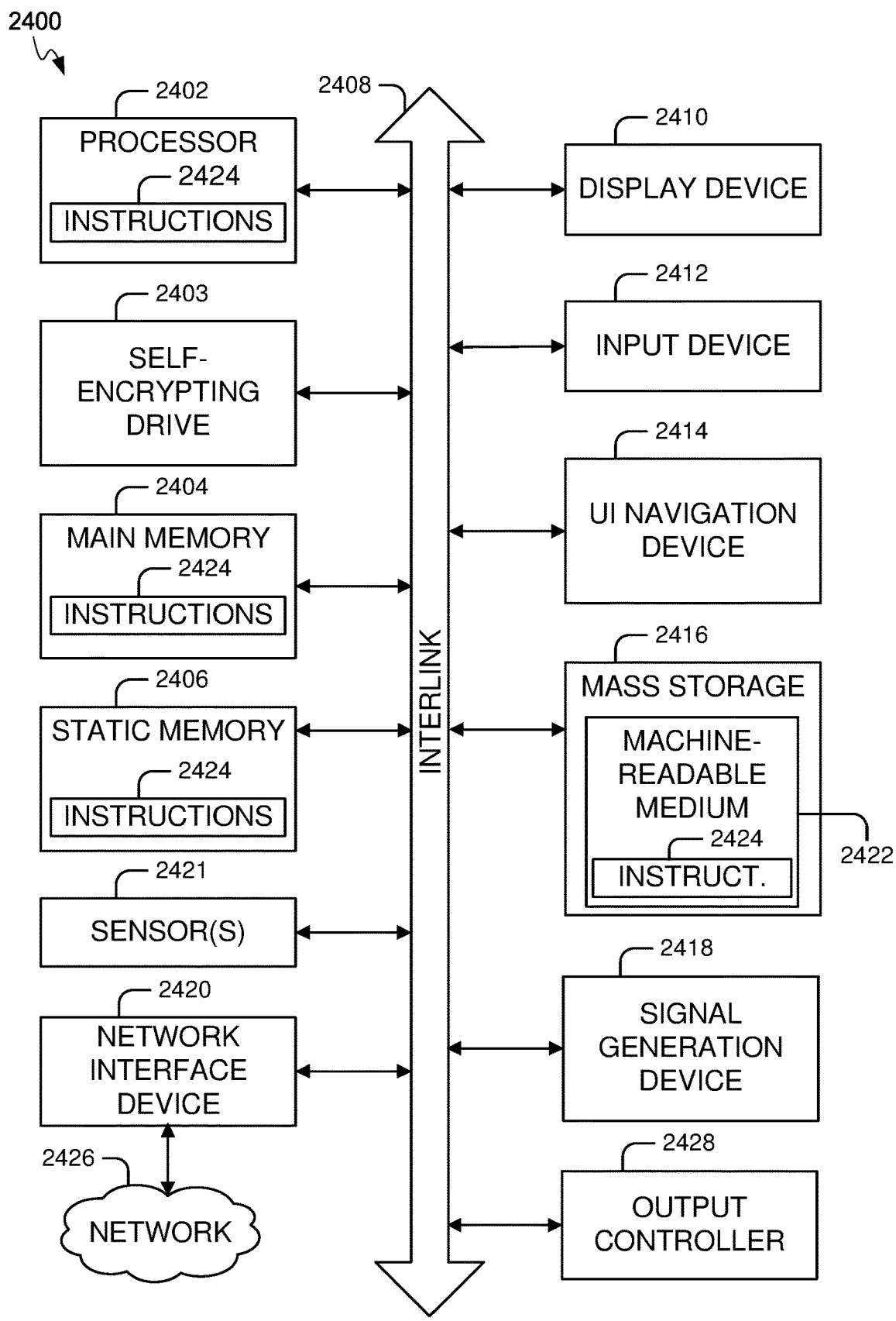
FIG. 24 is a block diagram illustrating an example of a machine upon or by which one or more example process embodiments described herein may be implemented or controlled.

FIG. 24 is a block diagram illustrating an example of a machine 2400 upon or by which one or more example process embodiments described herein may be implemented or controlled. In alternative embodiments, the machine 2400 may operate as a standalone device or may be connected (e.g., networked) to other machines. In a networked deployment, the machine 2400 may operate in the capacity of a server machine, a client machine, or both in server-client network environments. In an example, the machine 2400 may act as a peer machine in a peer-to-peer (P2P) (or other distributed) network environment. Further, while only a single machine 2400 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 2400 may include a hardware processor 2402 (e.g., a central processing unit (CPU), a hardware processor core, or any combination thereof), a self-encrypting drive (SED) 2403, a main memory 2404, and a static memory 2406, some or all of which may communicate with each other via an interlink (e.g., bus) 2408. The machine 2400 may further include a display device 2410, an alphanumeric input device 2412 (e.g., a keyboard), and a user interface (UI) navigation device 2414 (e.g., a mouse). In an example, the display device 2410, alphanumeric input device 2412, and UI navigation device 2414 may be a touch screen display. The machine 2400 may additionally include a mass storage device (e.g., drive unit) 2416, a signal generation device 2418 (e.g., a speaker), a network interface device 2420, and one or more sensors 2421, such as a Global Positioning System (GPS) sensor, compass, accelerometer, or another sensor. The machine 2400 may include an output controller 2428, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 2416 may include a machine-readable medium 2422 on which is stored one or more sets of data structures or instructions 2424 (e.g., software) embodying or utilized by any one or more of the techniques or functions described herein. The instructions 2424 may also reside, completely or at least partially, within the main memory 2404, within the static memory 2406, within the hardware processor 2402, or within the SED 2403 during execution thereof by the machine 2400. In an example, one or any combination of the hardware processor 2402, the SED 2403, the main memory 2404, the static memory 2406, or the mass storage device 2416 may constitute machine-readable media.

While the machine-readable medium 2422 is illustrated as a single medium, the term "machine-readable medium" may include a single medium, or multiple media, (e.g., a centralized or distributed database, and/or associated caches and servers) configured to store the one or more instructions 2424.

The term "machine-readable medium" may include any medium that is capable of storing, encoding, or carrying instructions 2424 for execution by the machine 2400 and that cause the machine 2400 to perform any one or more of the techniques of the present disclosure, or that is capable of storing, encoding, or carrying data structures used by or associated with such instructions 2424. Non-limiting machine-readable medium examples may include solid-state memories, and optical and magnetic media. In an example, a massed machine-readable medium comprises a machine-readable medium 2422 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2424 may further be transmitted or received over a communications network 2426 using a transmission medium via the network interface device 2420.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A system comprising:
   one or more computer processors;

a data channel connected to the one or more computer processors; and a self-encrypting device connected to the data channel, the self-encrypting device comprising:
- an authentication subsystem comprising an authentication controller;
- an encryption engine;
- a storage media that stores encrypted data that is encrypted with an encryption key provided by the authentication subsystem;
- a radio frequency (RF) transceiver for communications outside the data channel; and
- a data interface of an interface controller coupled with the data channel, the data interface being locked from sending and receiving data until the self-encrypting device is unlocked by the authentication subsystem with user-authentication information received via the RF transceiver.

2. The system as recited in claim 1, wherein the self-encrypting device authenticates a user without use of the one or more computer processors of the system.

3. The system as recited in claim 1, wherein the RF transceiver is configured for receiving, from a mobile device, the user-authentication information, the mobile device being separate from the one or more computer processors, wherein the self-encrypting device is configured for unlocking the data interface in response to receiving the user-authentication information from the mobile device.

4. The system as recited in claim 3, wherein the RF transceiver is configured for using independent encryption in RF communications with the mobile device, the independent encryption being separate from encryption provided by a communication protocol for the RF communications.

5. The system as recited in claim 3, wherein an application in the mobile device provides a user interface for obtaining the user-authentication information from a user.

6. The system as recited in claim 3, wherein an application in the mobile device authenticates a user by validating the user with a management server, wherein the mobile device sends to the self-encrypting device an unlock command in response to the management server validating the user.

7. The system as recited in claim 1, further comprising:
an encryption engine, wherein the authentication subsystem stores an encryption key and the authentication subsystem transmits the encryption key to the encryption engine when a user is successfully authenticated.

8. The system as recited in claim 1, wherein the self-encrypting device initializes a timer when a shutdown of the system is detected, wherein the self-encrypting device initializes in an unlocked state if the system is restarted before an expiration of the timer, wherein the self-encrypting device initializes in a locked state if the system is restarted after the expiration of the timer.

9. The system as recited in claim 1, wherein data is transmitted in clear form between the data interface and the data channel.

10. The system as recited in claim 1, wherein the system is one of a laptop, a personal computer, a kitchen appliance, a printer, a scanner, a server, a tablet device, a medical device, a door-unlocking system, a secure access system, an access control device, a home-automation device, a home appliance, a mobile phone, a vehicle, or a smart television set.

11. The system as recited in claim 1, wherein the self-encrypting device further includes a power source for supplying power to the authentication subsystem while self-encrypting device is locked.

12. A method comprising:
providing a self-encrypting device in a host computer system, the host computer system further having one or more processors and a data channel connected to the one or more processors and connected to the self-encrypting device;

establishing a communication channel between a data interface of the self-encrypting device and the data channel, the communication channel being locked until the self-encrypting device is authenticated;

receiving, via a radio frequency (RF) transceiver of the self-encrypting device for communications outside the data channel, user-authentication information;

unlocking, by an authentication subsystem of the self-encrypting device, the communication channel based on the user-authentication information;

encrypting data, received by the self-encrypting device through the data interface, with an encryption key provided by the authentication subsystem of the self-encrypting device; and storing the encrypted data in a storage subsystem of the self-encrypting device.

13. The method as recited in claim 12, wherein the self-encrypting device authenticates a user without use of the one or more processors of the host computer system.

14. The method as recited in claim 12, further comprising:
receiving, via the RF transceiver and from a mobile device, the user-authentication information; and
unlocking the self-encrypting device in response to receiving the user-authentication information via the RF transceiver.

15. The method as recited in claim 14, wherein an application in the mobile device authenticates a user by validating the user with a management server, the method further comprising:
receiving an unlock command from the mobile device in response to the management server validating the user.

16. The method as recited in claim 12, wherein the self-encrypting device initializes a timer when a shutdown of the host computer system is detected, wherein the self-encrypting device initializes in an unlocked state if the host computer system is restarted before an expiration of the timer, wherein the self-encrypting device initializes in a locked state if the host computer system is restarted after the expiration of the timer.

17. A non-transitory machine-readable storage medium including instructions that, when executed by a machine, cause the machine to perform operations comprising:
providing a self-encrypting device in a host computer system, the host computer system further having one or more processors and a data channel connected to the one or more processors and connected to the self-encrypting device;

establishing a communication channel between a data interface of the self-encrypting device and the data channel, the communication channel being locked until the self-encrypting device is authenticated;

receiving, via a radio frequency (RF) transceiver of the self-encrypting device for communications outside the data channel, user-authentication information;

unlocking, by an authentication subsystem of the self-encrypting device, the communication channel based on the user-authentication information;

encrypting data, received by the self-encrypting device through the data interface, with an encryption key provided by the authentication subsystem of the self-encrypting device; and storing the encrypted data in a storage subsystem of the self-encrypting device.

18. The non-transitory machine-readable storage medium as recited in claim 17, wherein the self-encrypting device authenticates a user without use of the one or more processors of the host computer system.

19. The non-transitory machine-readable storage medium as recited in claim 17, wherein the machine further performs operations comprising:
   receiving, via the RF transceiver and from a mobile device, the user-authentication information; and
   unlocking the self-encrypting device in response to receiving the user-authentication information via the RF transceiver.

20. The non-transitory machine-readable storage medium as recited in claim 19, wherein an application in the mobile device authenticates a user by validating the user with a management server, wherein the machine further performs operations comprising:
   receiving an unlock command from the mobile device in response to the management server validating the user.

\* \* \* \* \*

UNITED STATES PATENT AND TRADEMARK OFFICE
CERTIFICATE OF CORRECTION

PATENT NO. : 10,778,417 B2
APPLICATION NO. : 16/103979
DATED : September 15, 2020
INVENTOR(S) : Bolotin et al.

It is certified that error appears in the above-identified patent and that said Letters Patent is hereby corrected as shown below:

In Column 4, Line 17, delete "e.g.," and insert --(e.g.,-- therefor

In Column 5, Line 49, delete "sub system" and insert --subsystem-- therefor

In Column 12, Line 48, delete "sub system" and insert --subsystem-- therefor

In Column 23, Line 48, delete "server console" and insert --server/console-- therefor Signed and Sealed this
Twenty-ninth Day of December, 2020

Andrei Iancu
*Director of the United States Patent and Trademark Office*